(12) United States Patent
Kamoto et al.

(10) Patent No.: US 7,264,664 B2
(45) Date of Patent: Sep. 4, 2007

(54) INK COMPOSITION, RECORDING METHOD AND RECORDED IMAGE UTILIZING THE SAME, INK SET AND INK HEAD

(75) Inventors: Takanori Kamoto, Nara (JP); Kiyofumi Morimoto, Tenri (JP); Hiromi Nakatsu, Amagasaki (JP); Masanori Kinomoto, Yamatokoriyama (JP); Hiroaki Nakaya, Osakasayama (JP)

(73) Assignee: Sharp Kabushiki Kaisha, Osaka (JP)

( * ) Notice: Subject to any disclaimer, the term of this patent is extended or adjusted under 35 U.S.C. 154(b) by 232 days.

(21) Appl. No.: 10/713,226

(22) Filed: Nov. 17, 2003

(65) Prior Publication Data

US 2004/0099182 A1 May 27, 2004

(30) Foreign Application Priority Data

Nov. 15, 2002 (JP) ............................ P2002-332752
Nov. 15, 2002 (JP) ............................ P2002-332753

(51) Int. Cl.
*C09D 11/02* (2006.01)
*G01D 11/00* (2006.01)

(52) U.S. Cl. ................ 106/31.59; 106/31.89; 106/31.27; 106/31.6; 106/31.86; 106/31.58; 347/100

(58) Field of Classification Search ............. 106/31.59, 106/31.27, 31.89, 31.6, 31.58, 31.86; 347/100
See application file for complete search history.

(56) References Cited

U.S. PATENT DOCUMENTS 5,601,639 A    2/1997  Myers et al.
5,746,818 A *  5/1998  Yatake ................. 106/31.86
5,766,327 A *  6/1998  Maze ................... 106/31.58

(Continued)

FOREIGN PATENT DOCUMENTS

JP    63-65034 B2    12/1988

(Continued)

OTHER PUBLICATIONS

Akio Kinoshita et al.; Tokushu Kinou Inki no Jissai Gijutu (Practical Technologies of Ink with Secial Functions), 1st popular edition, CMC Co., Nov. 15, 1999, p. 6-7.

(Continued)

*Primary Examiner*—C. Melissa Koslow
*Assistant Examiner*—Veronica Faison-Gee
(74) *Attorney, Agent, or Firm*—Birch, Stewart, Kolasch & Birch, LLP

(57) ABSTRACT

An ink composition is manufactured to contain a surfactant having difference d1 ($\sigma_{10}-\gamma$) which is difference between dynamic surface tension ($\sigma_{10}$) of the solution obtained by making 0.1 wt % solution dissolved in purified water to be measured by using a maximum bubble pressure method at the bubble frequency of 10 Hz at a temperature from 24° C. to 26° C. and static surface tension ($\gamma$) to be measured at a temperature from 24° C. to 26° C. and which satisfies 0 mN/m $\leq$ d1 $\leq$ 15 mN/m. An image is recorded by applying a voltage to partitions made of a piezoelectric material thereby applying a pressure to the ink composition supplied from an ink tank to an ink chamber of an ink head to discharge a liquid droplet of the ink composition, and depositing the liquid droplet onto a recording material.

6 Claims, 6 Drawing Sheets

U.S. PATENT DOCUMENTS

| | | | |
|---|---|---|---|
| 6,132,502 A * | 10/2000 | Yatake | 106/31.86 |
| 6,241,811 B1 * | 6/2001 | Sano | 106/31.85 |
| 6,440,203 B2 * | 8/2002 | Kato | 106/31.6 |
| 6,500,248 B1 * | 12/2002 | Hayashi | 106/31.86 |
| 6,630,017 B2 * | 10/2003 | Ma et al. | 106/31.59 |
| 6,737,449 B1 * | 5/2004 | Yatake | 523/160 |
| 6,786,955 B2 * | 9/2004 | Kabalnov | 106/31.27 |
| 2002/0007765 A1 * | 1/2002 | Sano et al. | 106/31.49 |

FOREIGN PATENT DOCUMENTS

| | | | |
|---|---|---|---|
| JP | 03-211057 B2 | 9/1991 | |
| JP | 2516218 B2 | 4/1996 | |
| JP | 2968010 B2 | 10/1999 | |

OTHER PUBLICATIONS

Joel Schwartz; Journal of Coating Technology, vol. 64, No. 812, Sep. 1992, pp. 65-74.

Medina, S.W. and Sutovich, M.N., American Ink Maker, vol. 72, No. 2, Feb. 1994, pp. 32-38.

* cited by examiner

INK COMPOSITION, RECORDING METHOD AND RECORDED IMAGE UTILIZING THE SAME, INK SET AND INK HEAD

This Nonprovisional application claims priority under 35 U.S.C. § 119(a) on Patent Application No(s). 2002-332752 and 2002-332753 filed in JAPAN on Nov. 15, 2002, the entire contents of which are hereby incorporated by reference.

BACKGROUND OF THE INVENTION

1. Field of the Invention

The invention relates to an ink composition advantageously employed in an ink jet recording method, a recording method and a recorded image utilizing the same, and an ink set and an ink head.

2. Description of the Related Art

The ink jet recording method is a method of recording an image by discharging and flying a liquid droplet of an ink composition (hereinafter also simply called "ink") by dynamic energy or thermal energy, and depositing such liquid droplet on a recording material such as paper.

Usually, characteristics of an ink employed in the ink jet recording method (hereinafter also called "ink jet ink") have been represented by physical properties such as a surface tension or a viscosity. It has been tried to 78 a drying property of the ink or to improve the quality of a formed image, by defining such physical properties.

For example, there is proposed an ink jet recording method by an ink droplet defined by a product of a Weber's number, including the surface tension as a parameter, and a Reynolds' number including the viscosity as a parameter. A high quality image is realized by maintaining the product of the Weber's number and the Reynolds' number within a certain range (cf. Japanese Examined Patent Publication JP-B2 2968010). Also there is proposed an ink jet recording method utilizing an ink with a surface tension within a specified range (cf. Japanese Examined Patent Publication JP-B2 63-65034 (1988)).

The surface tension used in the technologies described in the JP-B2 2968010 and JP-B2 63-65034 is a surface tension when a liquid surface reaches an equilibrium state, namely a static surface tension. Also the surface tension ordinarily employed as an index of the characteristics of the ink jet ink is a static surface tension (for example Akio Kinoshita et al., "*Tokushu Kinou Inki no Jissai Gijutu* (practical technologies of ink with special functions)", 1st popular edition, CMC Co., Nov. 15, 1999, p. 6-7). In this manner, the characteristics of the ink jet ink are often indicated by the static surface tension among the surface tensions.

However, it is difficult to sufficiently represent the characteristics of the ink only by the static surface tension only.

In an ink jet recording apparatus for recording an image by the ink jet recording method, an ink is filled in an ink chamber of an ink head, and ink liquid droplets are discharged and made to fly in successive manner from a discharge port provided at a front end of the ink chamber and deposited on a recording material to record an image. At the continuous discharges of the ink, a newly generated surface of the ink, namely a new meniscus, is formed in the discharge port simultaneously with a discharge of an ink droplet, and the surface tension of the ink varies for example at the start of formation of the newly generated surface in the discharge port, at a state immediately before discharge, at a moment of discharge, during a flight of the droplet, at a moment of landing on the recording material, and during a penetration into the recording material such as paper. The surface tension of the ink changes from time to time between a surface tension in a state of slow motion such as at the start of formation of a newly generated surface at the discharge port or during the penetration into the recording material such as paper, and a state of fast motion such as at the moment of discharge. Herein, the state of the slow motion can be regarded as a static state and it may be considered that the surface tension changes from the static state to the dynamic state every second. Consequently, in order to sufficient represent the characteristics of the ink jet ink, it is necessary to consider a dynamic surface tension which is the surface tension while the liquid surface is in the course of reaching an equilibrium state.

The importance of the dynamic surface tension is described in various references. For example, Schwartz, J. evaluates static surface tension and dynamic surface tension of waterborne paints and indicates that the dynamic surface tension is an important fact in the formation of a coated film with the waterborne paint and a low dynamic surface tension was effect for forming an uniform excellent coated film (cf. "The Importance of Low Dynamic Surface Tension in Waterborne Coatings", Journal of Coating Technology, US, Vol. 64, No. 812(1992.), pp65-74).

Also Medina, S. W. and Sutovich, M. N. discuss the importance of the dynamic surface tension in a high-speed printing, and suggest that the static surface tension, which is the surface tension when the liquid surface reaches an equilibrium, is effective as an index for representing the ink properties in a state of slow motion such as a penetration into paper and the like, but is not effective as an index for representing the ink properties particularly in a state of fast motion such as in a high-speed printing (cf. "Using Surfactants to Formulate VOC Comoliant Waterbased Inks", American Ink Maker, United States, Vol. 72, No. 2(1994), pp32-38).

There are also proposed an ink composition, suitable for the ink jet recording method, with a defined relationship between the dynamic surface tension and the viscosity, and a recording method utilizing the same. This technology indicates that satisfactory printing characteristics can be obtained within a range where the ink composition satisfies a condition [dynamic surface tension (dyne/cm) at a life 0 msec]+[viscosity (cP)]=42 to 49 (cf. Japanese Examined Patent Publication JP-B2 2516218).

However, though the technology described in JP-B2 2516218 defines the dynamic surface tension by a conditional expression of adding the values of the dynamic surface tension and the viscosity, the value of such conditional expression is meaningless since the dynamic surface tension and the viscosity differ in the unit, i.e., differ in the dimension.

Also, this technology only defines the dynamic surface tension, but does not define the static surface tension. In the ink jet recording method, as explained in the foregoing, the surface tension of the ink has great difference between a state of slow motion which can be regarded as the static state and a state of fast motion which is the dynamic state, so that both the dynamic surface tension and the static surface tension are required for sufficiently representing the characteristics of the ink jet ink.

Further, this technology only defines the dynamic surface tension in a state of fast motion, particularly, of 0 msec, but does not define the dynamic surface tension in a state of slow motion. In the ink jet recording method, as explained in the foregoing, the surface tension of the ink varies from time to time between a surface tension in a state of slow motion and a surface tension in a state of fast motion, so that both the dynamic surface tension at a state of fast motion and the dynamic surface tension at a state of slow motion are required for sufficiently representing the characteristics of the ink jet ink.

Also this technology indicates that the surfactant does not contribute in reducing the dynamic surface tension. However the surfactant is known to generally contribute significantly to a wetting property of the ink jet ink on an internal wall of the ink chamber or a property of the ink on the recording material, and is not only an essential component in the ink but also an important factor for controlling the dynamic surface tension. For example, Schwartz, J., in the aforementioned "The Importance of Low Dynamic Surface Tension in Waterborne Coatings", changing the static surface tension and the dynamic surface tension with certain surfactants and evaluating the influence thereof on the coated film formation, indicates that a reduction in the dynamic surface tension is effective in reducing a contraction of the coated film, a crater generation therein and a bubble entrapment therein. Also, Medina, S. W. and Sutovich, M. N. in the aforementioned "Using Surfactants to Formulate VOC Comoliant Waterbased Inks", indicates that the dynamic surface tension is a barometer of ability to which the surfactant included in the ink gives way to a newly generated surface of the ink formed in sequence in the discharge port or to an interface between a droplet of the ink deposited in sequence on the recording material and the recording material. In other words, the surfactant is adsorbed on the newly generated surface of the ink or the interface between a droplet of the ink and the recording material and thereby lowers the surface tension of the ink and therefore the higher ability by which the surfactant gives way to a newly generated surface of the ink or the interface between a droplet of the ink and the recording material becomes, the higher effect of lowering the surface tension of the ink in the state of fast motion becomes and a dynamic surface tension of the ink is lowered. Nature of the surfactant exerts a great influence on the dynamic surface tension of the ink.

SUMMARY OF THE INVENTION

An object of the invention is to provide an ink composition which controls relationship between a dynamic surface tension and a static surface tension of the ink composition by defining nature of the surfactant to be included in the ink composition and which is excellent in a discharge stability and can provide a high quality recorded image when employed in an ink jet recording method, a recording method and a recorded image utilizing the ink composition, and an ink set and an ink head.

Further, another object of the invention is to provide an ink composition which controls relationship between a dynamic surface tension in a state of fast motion and a dynamic surface tension in a state of slow motion of the ink composition by defining nature of the surfactant to be included in the ink composition and which is excellent in a discharge stability and can provide a high quality recorded image when employed in an ink jet recording method, a recording method and a recorded image utilizing the ink composition, and an ink set and an ink head.

The invention provides an ink composition comprising: a coloring agent; an organic solvent; water; and a surfactant having difference d1 ($\sigma_{10}-\gamma$) which is difference between dynamic surface tension ($\sigma_{10}$) of the solution obtained by making 0.1 wt % solution dissolved in purified water to be measured by using a maximum bubble pressure method at the bubble frequency of 10 Hz at a temperature from 24° C. to 26° C. and static surface tension ($\gamma$) to be measured at a temperature from 24° C. to 26° C. and which satisfies the following expression (1).

$$0 \text{ mN/m} \leq d1 \leq 15 \text{ mN/m} \tag{1}$$

According to the invention, the ink composition includes coloring agent, an organic solvent, water and a surfactant having difference d1 ($\sigma_{10}-\gamma$) which is difference between dynamic surface tension ($\sigma_{10}$) of the solution obtained by making 0.1 wt % solution dissolved in purified water to be measured by using a maximum bubble pressure method at the bubble frequency of 10 Hz at a temperature from 24° C. to 26° C. and static surface tension ($\gamma$) to be measured at a temperature from 24° C. to 26° C. and which is within the constant range. The dynamic surface tension and the static surface tension of the ink composition are changed by a kind and a content of the organic solvent included in the ink composition, but are most significantly affected by the surfactant. In other words, the dynamic surface tension and the static surface tension of the ink composition can be controlled by the surfactant. In an ink jet recording apparatus for recording an image with the ink jet recording method, at the successive discharges of liquid droplets of the ink composition, new surfaces of the ink compositions are generated in succession at the discharge port at the front end of the ink chamber in the ink head, whereby the motion of the ink composition is fast and there is a large influence of a dynamic surface tension. On the other hand, in the ink chamber, after the discharge of the ink composition, the ink composition is replenished by a capillary force from the ink tank by a volume corresponding to a decrease by the discharge, so that the motion of the ink composition is slow and the surface tension of the ink can be regarded as being in a static state and there is a large influence of the static surface tension. Thus, since both the dynamic surface tension and the static surface tension of the ink composition exert influences at the discharge, it is necessary to consider a balance of the dynamic surface tension and the static surface tension in order to achieve stable discharge of the liquid droplets of the ink composition. Also the ink composition, at the image recording by deposition of the liquid droplet onto the recording material, shows fast motion at the moment of landing of the liquid droplet onto the recording material, but becomes gradually slower thereafter and the ink composition penetrates slowly into the recording material when the recording material is an absorbent material. In this manner the surface tension of the ink composition changes from a dynamic surface tension to a static surface tension and therefore, a large difference between the dynamic surface tension and the static surface tension requires a long time for drying of the ink composition on the recording material thereby generating a blotting. Also a rear penetration is caused by an excessive permeation. Thus, in the ink jet recording method, there is importance in relationship between the dynamic surface tension and the static surface tension of the ink composition. As mentioned above, since the dynamic surface tension and the static surface tension of the ink composition can be controlled by the surfactant, relationship between the dynamic surface tension and the static surface tension of the ink composition can be controlled by defining nature of the surfactant included in the ink composition. Consequently, as mentioned above, as to the difference d1 ($=\sigma_{10}-\gamma$) between the dynamic surface tension ($\sigma_{10}$) of the solution obtained by making 0.1 wt % solution dissolved in purified water at the bubble frequency of 10 Hz and the static surface tension ($\gamma$) of the solution, relationship between the dynamic surface tension and the static surface tension of the ink composition can become preferable by making a surfactant having d1 within a certain constant range included in the solution and therefore, when the ink composition is applied to the ink jet recording method, it is rendered possible to obtain an ink composition excellent in the discharge stability and capable of suppressing blotting on the recording material thereby providing a recorded image of a high quality.

Also, in the invention, it is preferable that the dynamic surface tension ($\sigma_{10}$) at the bubble frequency of 10 Hz and the static surface tension ($\gamma$) are within a range from 20 to 70 mN/m.

According to the invention, the dynamic surface tension ($\sigma_{10}$) at the bubble frequency of 10 Hz and the static surface tension ($\gamma$) are within a range from 20 to 70 mN/m. In case $\sigma_{10}$ and $\gamma$ are less than 20 mN/m, the dynamic surface tension and the static surface tension of the ink composition become excessively low and therefore, permeability to the absorbent recording material becomes excessively high, whereby the ink composition upon being deposited on the absorbent recording material spreads from a landing point to a surrounding area thereby providing an unclear contour in a formed image. Also in case $\sigma_{10}$ and $\gamma$ exceed 70 mN/m, the dynamic surface tension and the static surface tension of the ink composition become excessively high and therefore, the permeability to the absorbent recording material becomes excessively low, whereby a drying property is lowered on the absorbent recording material. Also the ink composition shows a lowered wetting property on the inner wall of the ink chamber to hinder the supply of the ink composition into the ink chamber, whereby the ink composition cannot be smoothly filled in the ink chamber and cannot be discharged stably in the liquid droplets. Also it becomes difficult to form a newly generated surface of the ink composition in a desired form in the discharge port provided at the front end of the ink chamber, namely difficult to control the meniscus, whereby the discharge of liquid droplets of the ink composition in successive manner at a high speed becomes impossible. Consequently, as mentioned above, the dynamic surface tension ($\sigma_{10}$) of the solution obtained by making 0.1 wt % solution dissolved in purified water at the bubble frequency of 10 Hz and the static surface tension ($\gamma$) of the solution are within a range from 20 to 70 mN/m, and a surfactant having difference d1 ($\sigma_{10}-\gamma$) between $\sigma_{10}$ and $\gamma$ within a certain constant range is made included in the solution and thereby, when the surfactant is applied to an ink jet recording method, it is rendered possible to obtain an ink composition excellent in the discharge stability and capable of suppressing blotting on the recording material thereby providing a recorded image of a high quality.

Also in the invention it is preferable that the medium contains at least either of a glycol ether and a polyhydric alcohol.

According to the invention, since the medium contains at least either of a glycol ether and a polyhydric alcohol of a low vapor pressure, it is possible to obtain a moistening effect and to improve the stability of discharge.

Also in the invention it is preferable that the coloring agent includes a dye.

According to the invention, since the coloring agent includes a dye, it is rendered possible to suppress occurrence of nozzle clogging and to improve the stability of discharge.

Also in the invention it is preferable that the coloring agent includes a pigment.

According to the invention, since the coloring agent includes a pigment, there can be obtained a recorded image excellent in light fastness and water resistance.

Also in the invention it is preferable that the pigment has a hydrophilic group.

According to the invention, since the pigment has a hydrophilic group, it can be present in a stable dispersion in the ink composition containing water. It is therefore possible to suppress occurrence of nozzle clogging, and there can be obtained an ink composition capable of providing a recorded image excellent in light fastness and water resistance, without deteriorating the stability of discharge.

Also in the invention it is preferable that the surfactant includes a nonionic surfactant.

According to the invention, since the surfactant includes a nonionic surfactant less susceptible to an influence of a co-existing electrolyte, relationship between the dynamic surface tension and the static surface tension of the ink composition, which are controlled by the surfactant, can be made preferable regardless whether an electrolyte is added to the ink composition.

Also in the invention it is preferable that the surfactant is contained at a critical micelle concentration or higher.

According to the invention, the surfactant is contained at a critical micelle concentration or higher. A surface tension of a solution containing a surfactant is lowered with an increase in the surfactant up to the critical micelle concentration, but remains substantially constant at or above the critical micelle concentration. Therefore, by the presence of the surfactant at or above the critical micelle concentration, it is rendered possible to fully exploit the effect of the surfactant, and to keep the dynamic surface tension and the static surface tension of the ink composition controlled by the surfactant substantially constant respectively, whereby an ink composition having uniform properties can be obtained.

Also in the invention it is preferable that the pigment includes at least either of C.I. Pigment blue 15:3 and C.I. Pigment blue 15:4.

According to the invention, since the pigment includes at least either of C.I. Pigment blue 15:3 and C. I. Pigment blue 15:4, there can be obtained an ink composition capable of realizing a recorded image with an excellent cyan color formation.

Also in the invention it is preferable that the pigment includes at least one selected from the group consisting of C.I. Pigment red 122, C.I. Pigment red 209 and C.I. Pigment violet 19.

According to the invention, since the pigment includes at least one selected from the group consisting of C.I. Pigment red 122, C.I. Pigment red 209 and C.I. Pigment violet 19, there can be obtained an ink composition capable of realizing a recorded image with an excellent magenta color formation.

Also in the invention it is preferable that the pigment includes at least one selected from the group consisting of C.I. Pigment yellow 74, C.I. Pigment yellow 138, C.I. Pigment yellow 150 and C.I. Pigment yellow 180.

According to the invention, since the pigment includes at least one selected from the group consisting of C.I. Pigment yellow 74, C.I. Pigment yellow 138, C.I. Pigment yellow 150 and C.I. Pigment yellow 180, there can be obtained an ink composition capable of realizing a recorded image with an excellent yellow color formation.

Also in the invention it is preferable that the pigment includes carbon black.

According to the invention, since the pigment includes carbon black, there can be obtained an ink composition capable of realizing a recorded image with an excellent black color formation.

Also the invention provides a recording method for recording an image comprising: depositing an ink composition on a recording material, wherein the ink composition is either one of the ink compositions of the invention described in the foregoing.

According to the invention, the recording method for recording an image by depositing an ink composition on a recording material employs either one of the ink compositions of the invention described in the foregoing, thereby capable of providing a high quality recorded image in a stable manner.

Also the invention provides a recording method for recording an image comprising: pressurizing an ink composition to discharge a liquid droplet of the ink composition; and depositing the liquid droplet on a recording material, wherein the ink composition is either one of the ink compositions of the invention described in the foregoing.

According to the invention, the recording method for recording an image by pressurizing an ink composition to discharge a liquid droplet of the ink composition and depositing the liquid droplet on a recording material, namely an ink jet recording method, employs either one of the ink compositions of the invention described in the foregoing, thereby capable of stable discharge and providing a high quality recorded image in a stable manner.

Also in the invention it is preferable that the ink composition employs at least an ink composition in which the pigment includes at least either of C.I. Pigment blue 15:3 and C.I. Pigment blue 15:4; an ink composition in which the pigment includes at least one selected from the group consisting of C.I. Pigment red 122, C.I. Pigment red 209 and C.I. Pigment violet 19; and an ink composition in which the pigment includes at least one selected from the group consisting of C.I. Pigment yellow 74, C.I. Pigment yellow 138, C.I. Pigment yellow 150 and C.I. Pigment yellow 180.

According to the invention, the ink composition employs at least an ink composition capable of realizing a recorded image excellent in cyan color formation, an ink composition capable of realizing a recorded image excellent in magenta color formation and an ink composition capable of realizing a recorded image excellent in yellow color formation. Thus a recorded image of black color of a high density can be realized by superposing the aforementioned three ink compositions. Therefore various colors can be represented by employing the ink compositions of three kinds mentioned above, whereby a full-color recorded image with an excellent color formation can be provided.

Also in the invention it is preferable that the ink composition employs at least an ink composition in which the pigment includes at least either of C.I. Pigment blue 15:3 and C.I. Pigment blue 15:4; an ink composition in which the pigment includes at least one selected from the group consisting of C.I. Pigment red 122, C.I. Pigment red 209 and C.I. Pigment violet 19; an ink composition in which the pigment includes at least one selected from the group consisting of C.I. Pigment yellow 74, C.I. Pigment yellow 138, C.I. Pigment yellow 150 and C.I. Pigment yellow 180; and an ink composition in which the pigment includes carbon black.

According to the invention, the ink composition employs at least an ink composition capable of realizing a recorded image excellent in cyan color formation, an ink composition capable of realizing a recorded image excellent in magenta color formation, an ink composition capable of realizing a recorded image excellent in yellow color formation, and an ink composition capable of realizing a recorded image excellent in black color formation. Thus a recorded image of black color of a high density can be realized by superposing the three ink compositions, namely the ink composition capable of realizing a recorded image excellent in cyan color formation, the ink composition capable of realizing a recorded image excellent in magenta color formation, and the ink composition capable of realizing a recorded image excellent in yellow color formation. Therefore various colors can be represented by employing four ink compositions, namely the aforementioned three ink compositions and the ink composition capable of realizing a recorded image of excellent black color formation, whereby a full-color recorded image with an excellent color formation can be provided.

Also the invention provides a recorded image recorded by the recording method described in the foregoing.

According to the invention, since the image is recorded by the recording method, there can be obtained a recorded image of a high quality.

Also the invention provides an ink set comprising:
an ink composition in which the pigment includes at least either of C.I. Pigment blue 15:3 and C.I. Pigment blue 15:4;
an ink composition in which the pigment includes at least one selected from the group consisting of C.I. Pigment red 122, C.I. Pigment red 209 and C.I. Pigment violet 19; and
an ink composition in which the pigment includes at least one selected from the group consisting of C.I. Pigment yellow 74, C.I. Pigment yellow 138, C.I. Pigment yellow 150 and C.I. Pigment yellow 180.

According to the invention, the ink set includes an ink composition capable of realizing a recorded image excellent in cyan color formation, an ink composition capable of realizing a recorded image excellent in magenta color formation and an ink composition capable of realizing a recorded image excellent in yellow color formation. Thus a recorded image of black color of a high density can be realized by superposing the aforementioned three ink compositions. Thus the ink set including the aforementioned three ink compositions provides an excellent color balance. Therefore various colors can be represented by employing the ink set including aforementioned three ink compositions, whereby a full-color recorded image with an excellent color formation can be provided.

Also the invention provides an ink set comprising:
an ink composition in which the pigment includes at least either of C.I. Pigment blue 15:3 and C.I. Pigment blue 15:4;
an ink composition in which the pigment includes at least one selected from the group consisting of C.I. Pigment red 122, C.I. Pigment red 209 and C.I. Pigment violet 19;
an ink composition in which the pigment includes at least one selected from the group consisting of C.I. Pigment yellow 74, C.I. Pigment yellow 138, C.I. Pigment yellow 150 and C.I. Pigment yellow 180; and
an ink composition in which the pigment includes carbon black.

According to the invention, the ink set includes an ink composition capable of realizing a recorded image excellent in cyan color formation, an ink composition capable of realizing a recorded image excellent in magenta color formation, an ink composition capable of realizing a recorded image excellent in yellow color formation, and an ink composition capable of realizing a recorded image excellent in black color formation. Thus a recorded image of black color of a high density can be realized by superposing the aforementioned three ink compositions, namely the ink composition capable of realizing a recorded image excellent in cyan color formation, the ink composition capable of realizing a recorded image excellent in magenta color formation, and the ink composition capable of realizing a recorded image excellent in yellow color formation. Thus the ink set including the aforementioned three ink compositions provides an excellent color balance. Therefore various colors can be represented by employing the ink set including four ink compositions, namely the aforementioned three ink compositions and the ink composition capable of realizing a recorded image excellent in black color formation, whereby a full-color recorded image with an excellent color formation can be provided.

Also the invention provides an ink head comprising:

an ink tank for storing any of the ink compositions of the invention described in the foregoing;

an ink chamber having a discharge port for discharging a liquid droplet of the ink composition and receiving a supply of the ink composition from the ink tank;

a piezoelectric element generating a strain in response to an applied voltage and provided at least in a part of the ink chamber thereby applying a pressure to the ink composition contained in the ink chamber; and an electrode provided for applying a voltage to the piezoelectric element.

According to the invention, the ink head stores any of the ink compositions of the invention by the ink tank; contains the ink composition supplied from the ink tank by an ink chamber having a discharge port for discharging a liquid droplet of the ink composition; applies a voltage to the piezoelectric element by an electrode; and applies a pressure to the ink composition contained in the ink chamber by a piezoelectric element generating a strain in response to an applied voltage and provided at least in a part of the ink chamber. Thus there can be obtained a piezo type ink head capable of discharging a liquid droplet of the ink composition from the discharge port in response to the voltage applied to the piezoelectric element. Also, since the ink tank stores any of the ink compositions of the invention, the liquid droplet of the ink composition can be discharged in a stable manner from the discharge port. Such ink head allows to realize an ink jet recording apparatus of piezo type of a high reliability.

Also the invention provides an ink head comprising:

an ink tank for storing any of the ink compositions of the invention described in the foregoing;

an ink chamber having a discharge port for discharging a liquid droplet of the ink composition and receiving a supply of the ink composition from the ink tank;

a heat generating member provided in at least a part of the ink chamber and adapted to heat the ink composition contained in the ink chamber to generate a bubble therein thereby applying a pressure to the ink composition; and an electrode provided for applying a voltage to the heat generating member.

According to the invention, the ink head stores any of the ink compositions of the invention by the ink tank; contains the ink composition supplied from the ink tank by an ink chamber having a discharge port for discharging a liquid droplet of the ink composition; applies a voltage to the heat generating member by an electrode; and heats the ink composition contained in the ink chamber by a heat generating member provided in at least a part of the ink chamber to generate a bubble thereby applying a pressure to the ink composition. Thus there can be obtained a ink head of thermal ink jet type capable of discharging a liquid droplet of the ink composition from the discharge port in response to the voltage applied to the heat generating member. Also, since the ink tank stores any of the ink compositions of the invention, the liquid droplet of the ink composition can be discharged in a stable manner from the discharge port. Such ink head allows to realize an ink jet recording apparatus of thermal ink jet type of a high reliability.

Also the invention provides a recorded image recorded by a deposition of a liquid droplet of an ink composition, discharged by the ink head of the piezo type, onto a recording material.

According to the invention, since the recorded image is formed by the deposition, on the recording material, of the liquid droplet of the ink composition discharged by the ink head of the piezo type capable of discharging the liquid droplet of the ink composition in stable manner as explained above, a recorded image of a high quality can be obtained in a stable manner.

Also the invention provides a recorded image recorded by a deposition of a liquid droplet of an ink composition, discharged by the ink head of the thermal ink jet type, onto a recording material.

According to the invention, since the recorded image is formed by the deposition, on the recording material, of the liquid droplet of the ink composition discharged by the ink head of the thermal ink jet type capable of discharging the liquid droplet of the ink composition in stable manner as explained above, a recorded image of a high quality can be obtained in a stable manner.

The invention provides an ink composition comprising: a coloring agent; an organic solvent; water; and a surfactant having difference d2 ($\sigma_{10}-\sigma_1$) which is difference between dynamic surface tension ($\sigma_{10}$) measured at the bubble frequency of 10 Hz among dynamic surface tensions of the solution obtained by making 0.1 wt % solution dissolved in purified water to be measured by using a maximum bubble pressure method at a temperature from 24° C. to 26° C. and dynamic surface tension ($\sigma_1$) to be measured at the bubble frequency of 1 Hz and which satisfies the following expression (2).

$$0 \text{ mN/m} \leq d2 \leq 15 \text{ mN/m} \tag{2}$$

According to the invention, the ink composition includes coloring agent, an organic solvent, water and a surfactant having difference d2 ($\sigma_{10}-\sigma_1$) which is difference between dynamic surface tension ($\sigma_{10}$) measured at the bubble frequency of 10 Hz among dynamic surface tensions of the solution obtained by making 0.1 wt % solution dissolved in purified water to be measured by using a maximum bubble pressure method at a temperature from 24° C. to 26° C. and dynamic surface tension ($\sigma_1$) to be measured at the bubble frequency of 1 Hz and which is within the constant range. The dynamic surface tension and of the ink composition is changed by a kind and a content of the organic solvent included in the ink composition, but is most significantly affected by the surfactant. In other words, the dynamic surface tension of the ink composition can be controlled by the surfactant. In an ink jet recording apparatus for recording an image with the ink jet recording method, at the successive discharges of liquid droplets of the ink composition, new surfaces of the ink compositions are generated in succession at the discharge port at the front end of the ink chamber in the ink head, whereby the motion of the ink composition is fast and there is a large influence of a dynamic surface tension at a higher frequency of about 10 Hz, corresponding to the dynamic surface tension in a state of fast motion. On the other hand, in the ink chamber, after the discharge of the ink composition, the ink composition is replenished by a capillary force from the ink tank by a volume corresponding to a decrease by the discharge, so that the motion of the ink composition is slow and there is a large influence of a dynamic surface tension at a lower frequency of about 1 Hz, corresponding to the dynamic surface tension in a state of slow motion. Thus, since both the dynamic surface tension at the higher frequency and the dynamic surface tension at the lower frequency exert influences at the discharge, it is necessary to consider a balance of the dynamic surface tension of the higher frequency and the dynamic surface tension of the lower frequency in order to achieve stable discharge of the liquid droplets of the ink composition. Also the ink composition, at the image recording by deposition of the liquid droplet onto the recording material, shows fast motion at the moment of landing of the liquid droplet onto the recording material, but becomes gradually slower thereafter and the ink composition penetrates slowly into the recording material when the recording material is an absorbent material. In this manner the dynamic surface tension of the ink composition changes from a dynamic surface tension in a state of fast motion to a dynamic surface tension in a state of slow motion, and, in case the dynamic surface tension at the higher frequency and the dynamic surface tension at the lower frequency have a large difference, the ink composition requires a long time for drying on the recording material thereby generating a blotting. Also a rear penetration is caused by an excessive permeation. Thus, in the ink jet recording method, there is importance in relationship between the dynamic surface tension at high frequency and the static surface tension at low frequency concerning the ink composition. As mentioned above, since the dynamic surface tension and the static surface tension of the ink composition can be controlled by the surfactant, relationship between the dynamic surface tension at high frequency and the static surface tension at low frequency concerning the ink composition can be controlled by defining nature of the surfactant included in the ink composition. Consequently, as mentioned above, as to difference d2 $(=\sigma_{10}-\sigma_1)$ between the dynamic surface tension $(\sigma_{10})$ of the solution obtained by making 0.1 wt % solution dissolved in purified water at the bubble frequency of 10 Hz and the dynamic surface tension $(\sigma_1)$ of the solution at the bubble frequency of 1 Hz, relationship between the dynamic surface tension at high frequency and the static surface tension at low frequency concerning the ink composition can become preferable by making a surfactant having d2 within a certain constant range included in the solution and therefore, when the ink composition is applied to the ink jet recording method, it is rendered possible to obtain an ink composition excellent in the discharge stability and capable of suppressing blotting on the recording material thereby providing a recorded image of a high quality.

Also in the invention it is preferable that the dynamic surface tension $(\sigma_{10})$ at the bubble frequency of 10 Hz and the dynamic surface tension $(\sigma_1)$ at the bubble frequency of 1 Hz are within a range from 20 to 70 mN/m.

According to the invention, the dynamic surface tension $(\sigma_{10})$ at the bubble frequency of 10 Hz and the dynamic surface tension $(\sigma_1)$ at the bubble frequency of 1 Hz are within a range from 20 to 70 mN/m. In case $\sigma_{10}$ and $\sigma_1$ are less than 20 mN/m, the dynamic surface tension at high frequency and the dynamic surface tension at low frequency concerning the ink composition become excessively low and therefore, permeability to the absorbent recording material becomes excessively high, whereby the ink composition upon being deposited on the absorbent recording material spreads from a landing point to a surrounding area thereby providing an unclear contour in a formed image. Also in case $\sigma_{10}$ and $\sigma_1$ exceed 70 mN/m, the dynamic surface tension at high frequency and the dynamic surface tension at low frequency concerning the ink composition become excessively high and therefore, the permeability to the absorbent recording material becomes excessively low, whereby a drying property is lowered on the absorbent recording material. Also the ink composition shows a lowered wetting property on the inner wall of the ink chamber to hinder the supply of the ink composition into the ink chamber, whereby the ink composition cannot be smoothly filled in the ink chamber and cannot be discharged stably in the liquid droplets. Also it becomes difficult to form a newly generated surface of the ink composition in a desired form in the discharge port provided at the front end of the ink chamber, namely difficult to control the meniscus, whereby the discharge of liquid droplets of the ink composition in successive manner at a high speed becomes impossible. Consequently, as mentioned above, the dynamic surface tension $(\sigma_{10})$ of the solution obtained by making 0.1 wt % solution dissolved in purified water at the bubble frequency of 10 Hz and the dynamic surface tension $(\sigma_1)$ of the solution at the bubble frequency of 1 Hz are within a range from 20 to 70 mN/m and by making surfactant having difference d2 $(=\sigma_{10}-\sigma_1)$ between $\sigma_{10}$ and $\sigma_1$ within a certain range included in the solution, it is rendered possible to obtain an ink composition which is excellent in the discharge stability and is capable of suppressing blotting on the recording material thereby providing a recorded image of a high quality when the solution is applied to an ink jet recording method.

Also in the invention it is preferable that the medium includes at least either of a glycol ether and a polyhydric alcohol.

According to the invention, since the medium includes at least either of a glycol ether and a polyhydric alcohol of a low vapor pressure, there can be obtained a moistening effect thereby improving the discharge stability.

Also in the invention it is preferable that the coloring agent includes a dye.

According to the invention, since the coloring agent includes a dye, it is possible to suppress clogging of the discharge port thereby improving the discharge stability.

Also in the invention it is preferable that the coloring agent includes a pigment.

According to the invention, since the coloring agent includes a pigment, it is possible to obtain a recorded image excellent in light fastness and water resistance.

Also in the invention it is preferable that a pigment has a hydrophilic group.

According to the invention, since the coloring agent includes a pigment having a hydrophilic group, it is possible to obtain a recorded image excellent in light fastness and water resistance. Also the pigment, having a hydrophilic group, can be present in a stably dispersed state in the ink composition containing water. It is therefore rendered possible to suppress generation of a clogging phenomenon, and there can be obtained an ink composition capable of obtaining a recorded image excellent in light fastness and water resistance, without deteriorating the discharge stability.

Also in the invention it is preferable that the surfactant includes a nonionic surfactant.

According to the invention, since the surfactant includes a nonionic surfactant which is less susceptible to the influence of a co-existing electrolyte, the relationship between the dynamic surface tension at high frequency and the dynamic surface tension at low frequency controlled by the surfactant concerning the ink composition can be made preferable regardless whether an electrolyte is added or not to the ink composition.

Also in the invention it is preferable that the surfactant is contained by a critical micelle concentration or higher.

According to the invention, the surfactant is contained at a critical micelle concentration or higher. A surface tension of a solution containing a surfactant is lowered with an increase in the surfactant up to the critical micelle concentration, but remains substantially constant at or above the critical micelle concentration. Therefore, by the presence of the surfactant at or above the critical micelle concentration as described above, it is rendered possible to fully exploit the effect of the surfactant, and to maintain the dynamic surface tension at high frequency and the dynamic surface tension at low frequency, controlled by the surfactant, at substantially constant values respectively, whereby an ink composition of uniform property can be obtained.

Also in the invention it is preferable that the pigment includes at least either of C.I. Pigment blue 15:3 and C.I. Pigment blue 15:4.

According to the invention, since the pigment includes at least either of C.I. Pigment blue 15:3 and C. I. Pigment blue 15:4, there can be obtained an ink composition capable of realizing a recorded image with an excellent cyan color formation.

Also in the invention it is preferable that the pigment includes at least one selected from the group consisting of C.I. Pigment red 122, C.I. Pigment red 209 and C.I. Pigment violet 19.

According to the invention, since the pigment includes at least one selected from the group consisting of C.I. Pigment red 122, C.I. Pigment red 209 and C.I. Pigment violet 19, there can be obtained an ink composition capable of realizing a recorded image with an excellent magenta color formation.

Also in the invention it is preferable that the pigment includes at least one selected from the group consisting of C.I. Pigment yellow 74, C.I. Pigment yellow 138, C.I. Pigment yellow 150 and C.I. Pigment yellow 180.

According to the invention, since the pigment includes at least one selected from the group consisting of C.I. Pigment yellow 74, C.I. Pigment yellow 138, C.I. Pigment yellow 150 and C.I. Pigment yellow 180, there can be obtained an ink composition capable of realizing a recorded image with an excellent yellow color formation.

Also in the invention it is preferable that the pigment includes carbon black.

According to the invention, since the pigment includes carbon black, there can be obtained an ink composition capable of realizing a recorded image with an excellent black color formation.

Also the invention provides a recording method for recording an image comprising: depositing an ink composition on a recording material, wherein the ink composition is either one of the ink compositions of the invention described in the foregoing.

According to the invention, the recording method for recording an image by depositing an ink composition on a recording material employs either one of the ink compositions of the invention described in the foregoing, thereby capable of providing a high quality recorded image in a stable manner.

Also the invention provides a recording method for recording an image comprising: pressurizing an ink composition to discharge a liquid droplet of the ink composition; and depositing the liquid droplet on a recording material, wherein the ink composition is either one of the ink compositions of the invention described in the foregoing.

According to the invention, the recording method for recording an image by pressurizing an ink composition to discharge a liquid droplet of the ink composition and depositing the liquid droplet on a recording material, namely an ink jet recording method, employs either one of the ink compositions of the invention described in the foregoing, thereby capable of stable discharge and providing a high quality recorded image in a stable manner.

Also in the invention it is preferable that the ink composition employs at least an ink composition in which the pigment includes at least either of C.I. Pigment blue 15:3 and C.I. Pigment blue 15:4; an ink composition in which the pigment includes at least one selected from the group consisting of C.I. Pigment red 122, C.I. Pigment red 209 and C.I. Pigment violet 19; and an ink composition in which the pigment includes at least one selected from the group consisting of C.I. Pigment yellow 74, C.I. Pigment yellow 138, C.I. Pigment yellow 150 and C.I. Pigment yellow 180.

According to the invention, the ink composition employs at least an ink composition capable of realizing a recorded image excellent in cyan color formation, an ink composition capable of realizing a recorded image excellent in magenta color formation and an ink composition capable of realizing a recorded image excellent in yellow color formation. Thus a recorded image of black color of a high density can be realized by superposing the aforementioned three ink compositions. Therefore various colors can be represented by employing the ink compositions of three kinds mentioned above, whereby a full-color recorded image with an excellent color formation can be provided.

Also in the invention it is preferable that the ink composition employs at least an ink composition in which the pigment includes at least either of C.I. Pigment blue 15:3 and C.I. Pigment blue 15:4; an ink composition in which the pigment includes at least one selected from the group consisting of C.I. Pigment red 122, C.I. Pigment red 209 and C.I. Pigment violet 19; an ink composition in which the pigment includes at least one selected from the group consisting of C.I. Pigment yellow 74, C.I. Pigment yellow 138, C.I. Pigment yellow 150 and C.I. Pigment yellow 180; and an ink composition in which the pigment includes carbon black.

According to the invention, the ink composition employs at least an ink composition capable of realizing a recorded image excellent in cyan color formation, an ink composition capable of realizing a recorded image excellent in magenta color formation, an ink composition capable of realizing a recorded image excellent in yellow color formation, and an ink composition capable of realizing a recorded image excellent in black color formation. Thus a recorded image of black color of a high density can be realized by superposing the three ink compositions, namely the ink composition capable of realizing a recorded image excellent in cyan color formation, the ink composition capable of realizing a recorded image excellent in magenta color formation, and the ink composition capable of realizing a recorded image excellent in yellow color formation. Therefore various colors can be represented by employing four ink compositions, namely the aforementioned three ink compositions and the ink composition capable of realizing a recorded image of excellent black color formation, whereby a full-color recorded image with an excellent color formation can be provided.

Also the invention provides a recorded image recorded by the recording method described in the foregoing.

According to the invention, since the image is recorded by the recording method, there can be obtained a recorded image of a high quality.

Also the invention provides an ink set comprising:

an ink composition in which the pigment includes at least either of C.I. Pigment blue 15:3 and C.I. Pigment blue 15:4;

an ink composition in which the pigment includes at least one selected from the group consisting of C.I. Pigment red 122, C.I. Pigment red 209 and C.I. Pigment violet 19; and an ink composition in which the pigment includes at least one selected from the group consisting of C.I. Pigment yellow 74, C.I. Pigment yellow 138, C.I. Pigment yellow 150 and C.I. Pigment yellow 180.

According to the invention, the ink includes an ink composition capable of realizing a recorded image excellent in cyan color formation, an ink composition capable of realizing a recorded image excellent in magenta color formation and an ink composition capable of realizing a recorded image excellent in yellow color formation. Thus a recorded image of black color of a high density can be realized by superposing the aforementioned three ink compositions. Thus the ink set including the aforementioned three ink compositions provides an excellent color balance. Therefore various colors can be represented by employing the ink set including aforementioned three ink compositions, whereby a full-color recorded image with an excellent color formation can be provided.

Also the invention provides an ink set comprising:

an ink composition in which the pigment includes at least either of C.I. Pigment blue 15:3 and C.I. Pigment blue 15:4;

an ink composition in which the pigment includes at least one selected from the group consisting of C.I. Pigment red 122, C.I. Pigment red 209 and C.I. Pigment violet 19;

an ink composition in which the pigment includes at least one selected from the group consisting of C.I. Pigment yellow 74, C.I. Pigment yellow 138, C.I. Pigment yellow 150 and C.I. Pigment yellow 180; and an ink composition in which the pigment includes carbon black.

According to the invention, the ink set includes an ink composition capable of realizing a recorded image excellent in cyan color formation, an ink composition capable of realizing a recorded image excellent in magenta color formation, an ink composition capable of realizing a recorded image excellent in yellow color formation, and an ink composition capable of realizing a recorded image excellent in black color formation. Thus a recorded image of black color of a high density can be realized by superposing the aforementioned three ink compositions, namely the ink composition capable of realizing a recorded image excellent in cyan color formation, the ink composition capable of realizing a recorded image excellent in magenta color formation, and the ink composition capable of realizing a recorded image excellent in yellow color formation. Thus the ink set including the aforementioned three ink compositions provides an excellent color balance. Therefore various colors can be represented by employing the ink set including four ink compositions, namely the aforementioned three ink compositions and the ink composition capable of realizing a recorded image excellent in black color formation, whereby a full-color recorded image with an excellent color formation can be provided.

Also the invention provides an ink head comprising:

an ink tank for storing any of the ink compositions of the invention described in the foregoing;

an ink chamber having a discharge port for discharging a liquid droplet of the ink composition and receiving a supply of the ink composition from the ink tank;

a piezoelectric element generating a strain in response to an applied voltage and provided at least in a part of the ink chamber thereby applying a pressure to the ink composition contained in the ink chamber; and an electrode provided for applying a voltage to the piezoelectric element.

According to the invention, the ink head stores any of the ink compositions of the invention by the ink tank; contains the ink composition supplied from the ink tank by an ink chamber having a discharge port for discharging a liquid droplet of the ink composition; applies a voltage to the piezoelectric element by an electrode; and applies a pressure to the ink composition contained in the ink chamber by a piezoelectric element generating a strain in response to an applied voltage and provided at least in a part of the ink chamber. Thus there can be obtained a piezo type ink head capable of discharging a liquid droplet of the ink composition from the discharge port in response to the voltage applied to the piezoelectric element. Also, since the ink tank stores any of the ink compositions of the invention, the liquid droplet of the ink composition can be discharged in a stable manner from the discharge port. Such ink head allows to realize an ink jet recording apparatus of piezo type of a high reliability.

Also the invention provides an ink head comprising:

an ink tank for storing any of the ink compositions of the invention described in the foregoing;

an ink chamber having a discharge port for discharging a liquid droplet of the ink composition and receiving a supply of the ink composition from the ink tank;

a heat generating member provided in at least a part of the ink chamber and adapted to heat the ink composition contained in the ink chamber to generate a bubble therein thereby applying a pressure to the ink composition; and an electrode provided for applying a voltage to the heat generating member.

According to the invention, the ink head stores any of the ink compositions of the invention by the ink tank; contains the ink composition supplied from the ink tank by an ink chamber having a discharge port for discharging a liquid droplet of the ink composition; applies a voltage to the heat generating member by an electrode; and heats the ink composition contained in the ink chamber by a heat generating member provided at least in a part of the ink chamber to generate a bubble thereby applying a pressure to the ink composition. Thus there can be obtained a ink head of thermal ink jet type capable of discharging a liquid droplet of the ink composition from the discharge port in response to the voltage applied to the heat generating member. Also, since the ink tank stores any of the ink compositions of the invention, the liquid droplet of the ink composition can be discharged in a stable manner from the discharge port. Such ink head allows to realize an ink jet recording apparatus of thermal ink jet type of a high reliability.

Also the invention provides a recorded image recorded by a deposition of a liquid droplet of an ink composition, discharged by the ink head of the piezo type, onto a recording material.

According to the invention, since the recorded image is formed by the deposition, on the recording material, of the liquid droplet of the ink composition discharged by the ink head of the piezo type capable of discharging the liquid droplet of the ink composition in stable manner as explained above, a recorded image of a high quality can be obtained in a stable manner.

Also the invention provides a recorded image recorded by a deposition of a liquid droplet of an ink composition, discharged by the ink head of the thermal ink jet type, onto a recording material.

According to the invention, since the recorded image is formed by the deposition, on the recording material, of the liquid droplet of the ink composition discharged by the ink head of the thermal ink jet type capable of discharging the liquid droplet of the ink composition in stable manner as explained above, a recorded image of a high quality can be obtained in a stable manner.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
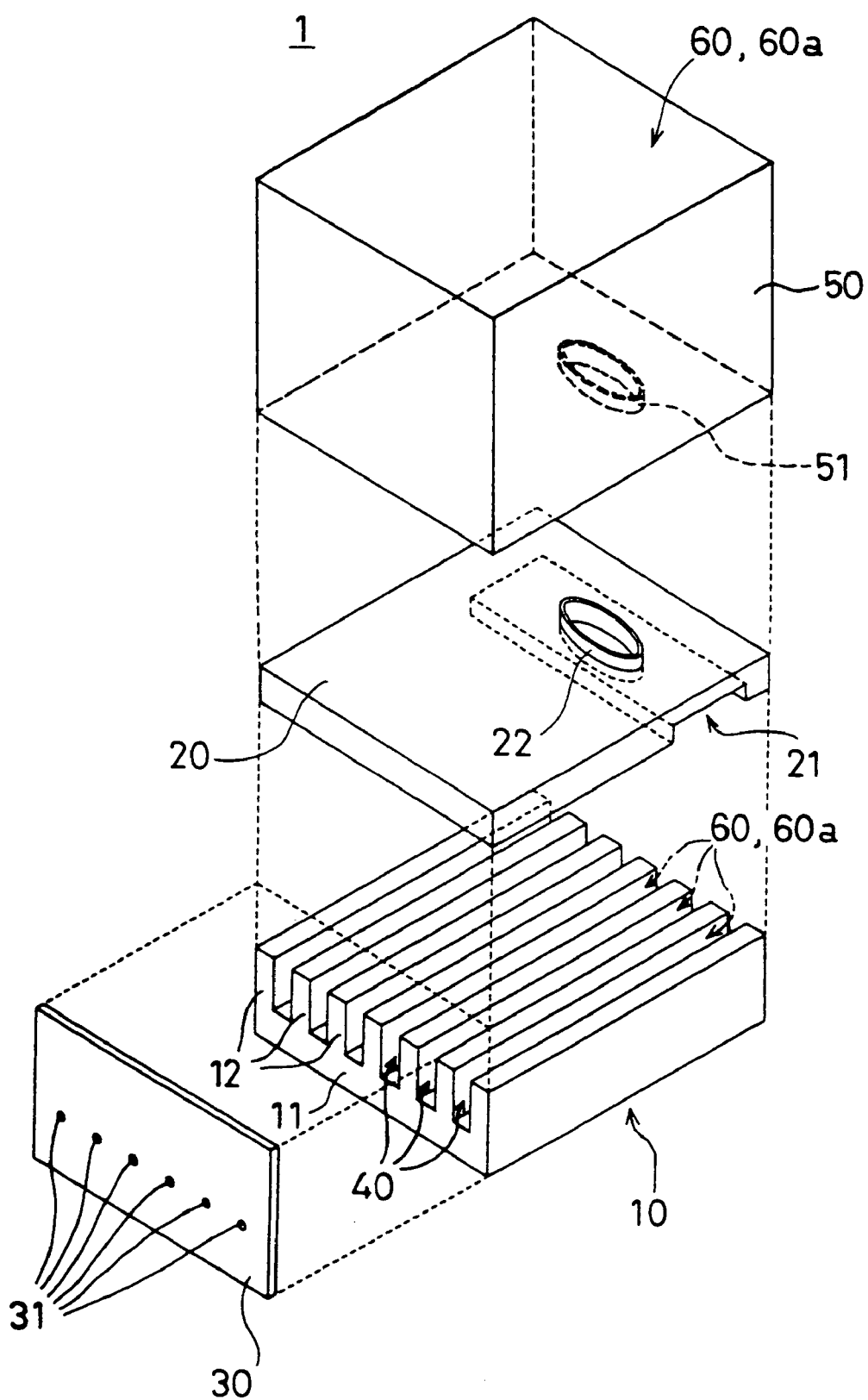
FIG. 1 is an exploded perspective view schematically showing the configuration of an ink head constituting a second embodiment of the invention.

Now referring to the drawings, preferred embodiments of the invention are described below.

The ink composition which is a primary embodiment in the invention includes coloring agent, an organic solvent, water and a surfactant having difference d1 ($\sigma_{10}-\gamma$) which is difference between dynamic surface tension ($\sigma_{10}$) of the solution obtained by making 0.1 wt % solution dissolved in purified water to be measured by using a maximum bubble pressure method at the bubble frequency of 10 Hz at a temperature from 24° C. to 26° C. and static surface tension ($\gamma$) to be measured at a temperature from 24° C. to 26° C. and which satisfies the following expression (1).

$$0 \text{ mN/m} \leq d1 \leq 15 \text{ mN/m} \tag{1}$$

Herein, the purified water means water having electric resistance rate more than $0.1 \times 10^6$ Ω·cm at 25° C. The electric resistance rate more than $0.1 \times 10^6$ Ω·cm corresponds to electric conductivity equal to or less than 10 μm/cm according to representation of electric conductivity.

The maximum bubble pressure method used for measuring the dynamic surface tension will be explained in the following.

The maximum bubble pressure method is a method for determining a surface tension by inserting a fine tube into a liquid, generating a bubble from an front end of the fine tube thereby forming a liquid-gas interface in the liquid, measuring a pressure difference value ΔP when the pressure difference between the interior and the exterior of the bubble becomes maximum, namely when the radius of the bubble becomes equal to the radius r of the fine tube, and determining a surface tension σ from such value. The surface tension σ is determined from a following equation (A).

$$\sigma = \Delta P \cdot r / 2 \tag{A}$$

By changing a bubble frequency, which is a number of generation of bubbles per unit time, it is possible to obtain surface tension from surface tension in a state of slow motion which can be regarded as a static sate to surface tension in a state of fast motion which is in a dynamic sate (i.e. dynamic surface tension). Also, by obtaining surface tension from surface tension in a state of slow motion which can be regarded as a static sate to surface tension in a state of fast motion which is in a dynamic sate, it is possible to evaluate a change in the dynamic property of the liquid.

Static surface tension can be measured, for example, by a circular ring method known as di Nuit method or a suspended plate method. In the embodiment, the static surface tension is measured by the suspended plate method.

An ink composition of the embodiment can be employed in a recording method for recording an image by depositing the ink composition onto a recording material, for example in an ink jet recording method or recording method with a writing utensil such as a pen. Use of the ink composition of the embodiment allows to obtain a recorded image of a high quality in a stable manner.

The ink composition of the embodiment is advantageously employed in an ink jet recording method. In the ink jet recording method, a pressure is applied to the ink composition to discharge a liquid droplet of the ink composition, and such liquid droplet is deposited on a recording material to record an image. Stable discharge of a liquid droplet of the ink composition can be performed and also a recording image of high quality can be stably provided with use of the ink composition of the embodiment for the ink jet recording method.

In an ink jet recording apparatus for recording an image by the ink jet recording method, at successive discharges of liquid droplets of the ink composition, a new surface of the ink composition is generated incessantly at a discharge port, provided at an front end of an ink chamber in an ink head, so that the motion of the ink composition is fast and the dynamic surface tension has a large influence. On the other hand, in the ink chamber, after the discharge of the ink composition, the ink composition is supplied from a capillary action from an ink tank by an amount corresponding to a volume decreased by the discharge, so that the motion of the ink composition is slow and can be considered a static state whereby the static surface tension has a large influence. Thus, since both the dynamic surface tension and the static surface tension of the ink composition exert influences in the discharge, it is necessary to consider a balance of the dynamic surface tension and the static surface tension in order to achieve stable discharge of the liquid droplets of the ink composition. Also at the image recording by depositing a liquid droplet of the ink composition onto the recording material, the motion of the ink composition is fast at a moment of landing of the liquid droplet on the recording material, but thereafter becomes gradually slower. When the recording material is absorbent recording material, the ink composition penetrates into the recording material. In other words, since the surface tension of the ink composition changes from dynamic to static, a large difference between the dynamic surface tension and the static surface tension requires a long time for drying of the ink composition on the recording material, thus resulting in a blotting or an excessive permeation leading to a rear penetration. Thus, in the ink jet recording method, there is importance in relationship between the dynamic surface tension and the static surface tension of the ink composition.

The dynamic surface tension and the static surface tension of the ink composition are changed by a kind and a content of the organic solvent included in the ink composition, but are most significantly affected by the surfactant. In other words, the dynamic surface tension and the static surface tension of the ink composition can be controlled by the surfactant and therefore relationship between dynamic surface tension and static surface tension of the ink composition can be controlled by defining nature of the surfactant to be included in the ink composition. Consequently, as mentioned above, as to a surfactant having difference d1 ($\sigma_{10}-\gamma$) which is difference between the dynamic surface tension ($\sigma_{10}$) of the solution obtained by making 0.1 wt % solution dissolved in purified water at bubble frequency 10 Hz and the static surface tension ($\gamma$) and which satisfies the following expression (1), relationship between the dynamic surface tension and the static surface tension of the ink composition can be made preferable by making the surfactant included in the ink composition. Therefore, when the ink composition is applied to the ink jet recording method, it is rendered possible to obtain an ink composition excellent in the discharge stability and capable of suppressing blotting on the recording material thereby providing a recorded image of a high quality.

In the following there will be explained a reason for restricting a design range in the ink composition of the embodiment.

In case $\sigma_{10}$ and $\gamma$ have a difference d1 ($=\sigma_{10}-\gamma$) exceeding 15 mN/m, the dynamic surface tension and the static surface tension of the ink composition at the lower frequency become ill-balanced whereby the liquid droplet cannot be discharged in a stable state. Also the drying on the recording material takes time and generates blotting, thereby deteriorating the image quality. Consequently a condition equal to or less than 15 mN/m is selected.

In case $\sigma_{10}$ and $\gamma$ have a difference d1 ($=\sigma_{10}-\gamma$) less than 0 mN/m, the static surface tension of the ink composition becomes high to deteriorate the wetting property of the ink composition on the components constituting the ink head, whereby the filling of the ink composition into the ink chamber becomes hindered. Consequently a condition equal to or larger than 0 mN/m is selected.

The dynamic surface tension ($\sigma_{10}$) at the bubble frequency of 10 Hz and the static surface tension ($\gamma$) are preferably within a range from 20 to 70 mN/m, more preferably from 20 to 45 mN/m.

In case $\sigma_{10}$ and $\gamma$ are less than 20 mN/m, the dynamic surface tension and the static surface tension of the ink composition become excessively low and therefore, permeability to the absorbent recording material becomes excessively high, whereby the ink composition upon being deposited on the absorbent recording material spreads from a landing point to a surrounding area thereby providing an unclear contour in a formed image. Also in case $\sigma_{10}$ and $\gamma$ exceed 70 mN/m, the dynamic surface tension and the static surface tension of the ink composition become excessively high and therefore, the permeability to the absorbent recording material becomes excessively low, whereby a drying property is lowered on the absorbent recording material. Also the ink composition shows a lowered wetting property on the inner wall of the ink chamber to hinder the supply of the ink composition into the ink chamber, whereby the ink composition cannot be smoothly filled in the ink chamber and cannot be discharged stably in the liquid droplets. Also it becomes difficult to form a newly generated surface of the ink composition in a desired form in the discharge port provided at the front end of the ink chamber, namely difficult to control the meniscus, whereby the discharge of liquid droplets of the ink composition in successive manner at a high speed becomes impossible. Consequently, $\sigma_{10}$ and $\gamma$ is defined as a value from 20 mN/m to 70 mN/m.

The surfactant can be a nonionic surfactant, an anionic surfactant, a cationic surfactant, or a combination thereof. The type of the surfactant, such as nonionic, cationic or anionic, is selected according to the type of an electrolyte contained in the ink composition. For example, in case the ink composition includes an anionic substance, there is employed a nonionic or anionic surfactant. Also, these surfactants may be used in combination with each other. At that time, sorts of nonionic, anionic or cationic surfactants may be the same or different.

Specific examples of the surfactant satisfying the above-mentioned condition include the surfactants represented by following general formulas (I), (II), (III), (IV), (V) and (VI), but the surfactant satisfying the above-mentioned condition is not limited by these examples.

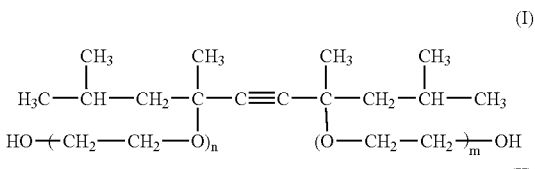

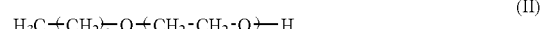

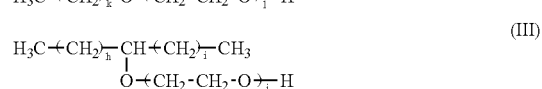

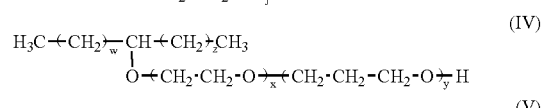

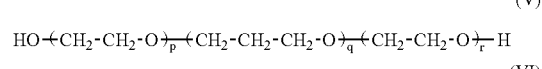

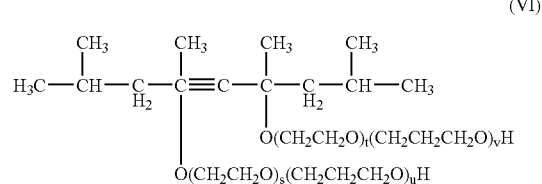

In the general formula (I), m represents an integer or a fractional number from 0 to 30; n represents an integer or a fractional number from 0 to 30; and a sum of m and n (m+n) represents an integer or a fractional number from 0 to 30.

In the general formula (II), k represents an integer or a fractional number from 11 to 13; and l represents an integer or a fractional number from 3 to 30.

In the general formula (III), h represents an integer or a fractional number from 0 to 11; i represents an integer or a fractional number from 0 to 11; j represents an integer or a fractional number from 3 to 50; and a sum of h and i (h+i) represents an integer or a fractional number from 9 to 11.

In the general formula (IV), w represents an integer or a fractional number from 0 to 11; x represents an integer or a fractional number from 5 to 9; y represents an integer or a fractional number from 2.5 to 5; z represents an integer or a fractional number from 0 to 9; and a sum of w and z (w+z) represents an integer or a fractional number from 9 to 11.

In the general formula (V), p represents an integer or a fractional number from 0 to 78; q represents an integer or a fractional number from 2 to 15; and r represents an integer or a fractional number from 0 to 18.

In the general formula (VI), s represents an integer or a fractional number from 0 to 30; t represents an integer or a fractional number from 0 to 30; and a sum of s and t (s+t) represents an integer or a fractional number from 0 to 30. Also, u represents an integer or a fractional number from 0 to 10; v represents an integer or a fractional number from 0 to 10; and a sum of u and v (u+v) represents an integer or a fractional number from 0 to 10.

Among the surfactants, a nonionic surfactant is less susceptible to an influence of a co-existing electrolyte and relationship between the dynamic surface tension and the static surface tension of the ink composition, which are controlled by the surfactant, can be made preferable regardless whether an electrolyte is added to the ink composition and therefore it is preferable that this nonionic surfactant is used as the surfactant of the invention.

The surfactant satisfying the above-mentioned condition is preferably included in the ink composition at a critical micelle concentration or higher. The surface tension of a solution containing a surfactant decreases with an increase in the surfactant up to the critical micelle concentration, but remains substantially constant above the critical micelle concentration. Therefore, by employing the surfactant at or above the critical micelle concentration as explained above, it is possible to fully exploit the effect of the surfactant and to maintain the dynamic surface tension and the static surface tension of the ink composition, controlled by the surfactant, at substantially constant values respectively, whereby an ink composition having uniform properties can be obtained.

The critical micelle concentration, though different for each surfactant, is about 0.001 to 3 wt. % (measuring temperature: 25° C.), for any of the nonionic surfactant, the anionic surfactant and the cationic surfactant.

The ink composition of the embodiment may include not only the surfactant satisfying the above-mentioned condition, but also another surfactant not satisfying the above-mentioned condition.

The ink composition of the embodiment includes water as mentioned above. Such composition allows to suppress blotting on the recording material and to improve the drying property.

A water content in the ink composition is preferably from 30 to 95 wt. %, more preferably 30 to 85 wt. %. A water content less than 30 wt. % results in an excessively large amount of the organic solvent in the ink composition, and it becomes difficult to exist stably an ink additive which is soluble or dispersible in water in the ink composition. Also there results a significant increase in the viscosity, which eventually comes out of an appropriate viscosity range of the ink composition. Also a water content exceeding 95 wt. % excessively reduces the amount of the organic solvent, whereby the wetting property of the ink composition cannot be maintained. Consequently there is selected a range of 30 to 95 wt. %.

Specific examples of the organic solvent include an amide such as dimethylformamide or dimethylacetamide; polyhydric alcohol such as polyethylene glycol, polypropylene glycol, ethylene glycol, diethylene grlycol, thiodiglycol, propylene glycol, triethylene glycol, 1,5-pentanediol, 1,4-butanediol, 1,2-hexanediol, 1,3propanediol, glycerin or 1,2,6-hexanetriol; an ether of polyhydric alcohol such as glycol ether such as ethylene glycol monomethyl ether, ethylene glycol monobutyl ether, diethylene glycol monomethyl ether, diethylene glycol monoethyl ether, triethylene glycol monobutyl ether, propylene glycol monoethyl ether, tetraethylene glycol monomethyl ether or ethylene glycol monophenyl ether; a sulfur-containing compound such as sulforane or dimethyl sulfoxide; a nitrogen-containing compound such as 2-pyrrolidone, N-methylpyrrolidone or ε-caprolactam, an oxygen-containing compound such as γ-butyrolactone; and a polyfunctional compound such as dimethylamino ethanol, diethylamino ethanol, triethanolamine or morpholine, but the organic solvent is not limited to such examples. These organic solvents may be used singly or in a mixture of two or more kinds.

Among these organic solvents, it is preferred to utilize a glycol ether or a polyhydric alcohol since such solvent has a low vapor pressure and provides a wetting effect when contained in the ink composition, thereby improving the stability of discharge. The medium preferably contains at least one of glycol ethers and polyhydric alcohols. Among the glycol ethers and the polyhydric alcohols, it is more preferred to employ, as the medium, diethylene glycol monobutyl ether, propylene glycol monobutyl ether, triethylene glycol monobutyl ether, or tetraethylene glycol monobutyl ether as a glycol ether, or glycerin, 1,2-hexane diol or 1,5-pentane diol as a polyhydric alcohol, as they have a vapor pressure of 0.05 mmHg or less at 25° C. and being excellent in wetting effect.

The organic solvent in the ink composition has a content preferably from 3 to 70 wt. %, more preferably 3 to 50 wt. %. A content of the organic solvent less than 3 wt. % results in a fast drying of the ink composition and is difficult to maintain the wetting property. Also in case a content of the organic solvent exceeds 70 wt. %, a water-soluble or water-dispersible ink additive may not be able to present stably. Also, depending upon the kind of the employed organic solvent, the viscosity shows a significant increase and exceeds an appropriate viscosity range of the ink composition. Consequently there is selected a range of 3 to 70 wt. %. However, in case the ink composition includes water as a principal component, the content of the organic solvent in the ink composition is preferably 3 to 40 wt. %, more preferably 3 to 30 wt. %. In case the ink composition includes water as a principal component and the content of the organic solvent exceeds 40 wt. %, there result a deterioration of the print quality of the obtained recording image and a delay in the drying time of the ink composition, though dependent on the kind of the employed coloring agent. Consequently there is selected a range of 3 to 40 wt. %.

The coloring agent can be a dye, a pigment or a mixture thereof. The dye or the pigment can be a substance containing the dye or pigment or a substance on which the dye or pigment is deposited.

Use of a dye as the coloring agent allows to suppress a clogging thereby improving the stability of discharge. Also use of a pigment as the coloring agent allows to obtain a recorded image excellent in light fastness and water resistance.

For reproducing various colors in a full-color ink jet recording method, there are employed ink compositions of three colors which as cyan (abbreviated as C), magenta (abbreviated as M) and yellow (abbreviated as Y), and various colors can be represented by mixing these ink compositions. However, since a black color is difficult to reproduce by mixing of the three colors, there is usually employed an ink composition of black color (abbreviated as B) for representing black color. There can be obtained an ink composition of cyan, magenta, yellow or black by changing the color of the included coloring agent.

The dye is advantageously employed a water-soluble dye such as an acidic dye, a direct dye, a reactive dye or a food dye. It is preferred, among these, to employ a dye excellent in water resistance, light fastness or safety.

Specific examples of the dye include following dyes, but the dye is not limited to such examples. In the following, dyes are represented by Color Index (C.I.) numbers.

Examples of the dye employable in the cyan ink composition include acidic dyes such as C.I. Acid blue 7, 9, 29, 45, 92 and 249; direct dyes such as C.I. Direct blue 1, 2, 6, 15, 22, 25, 71, 76, 79, 86, 90, 98, 163, 165, 199 and 202; and reactive dyes such as C.I. Reactive blue 1, 2, 7, 14, 15, 23, 32, 38, 41, 63, 80 and 95. It is preferred to employ, among these, at least one dye selected from a group of C.I. Acid blue 7 and 9 and C.I. Direct blue 199.

Examples of the dye employable in the magenta ink composition include acidic dyes such as C.I. Acid red 1, 8, 13, 14, 18, 26, 27, 35, 37, 42, 52, 82, 87, 89, 92, 97, 106, 111, 114, 115, 134, 186, 249, 254 and 289; direct dyes such as C.I. Direct red 1, 4, 9, 13, 17, 20, 28, 31, 39, 80, 81, 83, 89, 225 and 227, C.I. Direct orange 26, 29, 62 and 102; and reactive dyes such as C.I. Reactive red 1, 14, 17, 25, 26, 32, 37, 44, 46, 55, 58, 60, 66, 74, 79, 96, 97, 141, 147, 180 and 181. It is preferred to employ, among these, at least one dye selected from a group of C.I. Acid red 52 and 289, and C.I. Reactive red 58, 141 and 180.

Examples of the dye employable in the yellow ink composition include acidic dyes such as C.I. Acid yellow 1, 7, 17, 23, 42, 44, 79 and 142; direct dyes such as C.I. Direct yellow 1, 12, 24, 26, 33, 44, 50, 86, 120, 132, 142 and 144; and reactive dyes such as C.I. Reactive yellow 1, 5, 11, 13, 14, 20, 21, 22, 25, 40, 47, 51, 55, 65 and 67. It is preferred to employ, among these, at least one dye selected from a group of C.I. Acid yellow 17 and 23, and C.I. Direct yellow 86.

Examples of the dye employable in the black ink composition include food dyes such as C.I. Food black 2; direct dyes such as C.I. Direct black 19, 22, 32, 38, 51, 56, 71, 74, 75, 77, 154, 168 and 171; and reactive dyes such as C.I. Reactive black 3, 4, 7, 11, 12 and 17. It is preferred to employ, among these, at least either of C.I. Food black 2 and C.I. Direct black 154.

These dyes are employed within a stably soluble range at the normal temperature. Since such range is different for each dye, a content of the dye in the ink composition is not particularly limited, but is preferably 0.1 to 10 wt. %.

As to the pigment, there can be employed any pigment dispersible in a solution, but there is advantageously employed a pigment excellent in light fastness or safety.

Specific examples of the pigment include following pigments, but the pigment is not limited to such examples. In the following, pigments are represented by Color Index (C.I.) numbers.

Examples of the pigment employable in the cyan ink composition include C.I. Pigment blue 1, 2, 15, 16, 17, 21, 22, 60 and 64.

Examples of the pigment employable in the magenta ink composition include C.I. Pigment red 2, 3, 5, 16, 23, 31, 49, 57, 63, 122 and 209, and C.I. Pigment violet 19.

Examples of the pigment employable in the yellow ink composition include C.I. Pigment yellow 1, 2, 3, 5, 12, 74, 138, 150 and 180.

Examples of the pigment employable in the black ink composition include carbon black such as channel black, furnace black, thermal black or lamp black.

Among these pigments, it is preferred to employ, in the cyan ink composition, at least either of C.I. Pigment blue 15:3 and 15:4. For the magenta ink composition it is preferred to employ at least one pigment selected from a group of C.I. Pigment red 122, C.I. Pigment red 209, and C.I. Pigment violet 19. Also for the yellow ink composition it is preferred to employ at least one pigment selected from a group of C.I. Pigment yellow 74, C.I. Pigment yellow 138, C.I. Pigment yellow 150 and C.I. Pigment yellow 180. For the black ink composition it is preferred to employ at least one pigment selected from the aforementioned carbon blacks. By employing these pigments, there can be obtained an ink composition capable of realizing a recorded image excellent in cyan, magenta, yellow or black color formation.

It is also possible to obtain a black recorded image of a high density, close to a recorded image formed with a black ink composition, by superposing these three ink compositions of cyan, magenta and yellow colors employing these preferred pigments, namely a cyan ink composition in which the pigment includes at least either of C.I. Pigment blue 15:3 and C.I. Pigment blue 15:4; a magenta ink composition in which the pigment includes at least one selected from a group of C.I. Pigment red 122, C.I. Pigment red 209 and C.I. Pigment violet 19, and a yellow ink composition in which the pigment includes at least one selected from a group of C.I. Pigment yellow 74, C.I. Pigment yellow 138, C.I. Pigment yellow 150 and C.I. Pigment yellow 180. Thus the ink set including the aforementioned three ink compositions provides an excellent color balance. Therefore various colors can be represented by employing an ink set including these three ink compositions or an ink set including four ink compositions, namely these three ink compositions and a black ink composition employing carbon black, whereby a full-color recorded image with an excellent color formation can be provided.

The pigment preferably has one or plural hydrophilic groups selected from a group for example of a carboxyl group, a hydroxyl group, an amino group and a sulfonic acid group. Such hydrophilic group may be introduced directly to the surface of the pigment by a chemical modification, or introduced by covering the surface of the pigment with a polymer having such hydrophilic group thereby achieving a hydrophilic property. Also such hydrophilic group may be in a form of a salt.

The pigment having the hydrophilic group can be stably dispersed in an ink composition containing water. Therefore, by employing a pigment having a hydrophilic group as the coloring agent, it is possible to suppress the clogging, thereby obtaining a recorded image excellent in light fastness and water resistance without deteriorating the stability of discharge.

These pigments are employed within a stably dispersible range at the normal temperature. Since such range is different for each pigment, a content of the pigment in the ink composition is not particularly limited, but is preferably 0.1 to 10 wt. %.

The ink composition of the embodiment preferably includes a binder resin in case a pigment is employed as the coloring agent. Presence of a binder resin allows to prevent peeling of the pigment from the recording material.

As the binder resin, there is employed one or more selected from a group for example of a polyester resin, an acrylic resin, a styrene-acrylic copolymer resin and a polyester-acrylic copolymer resin.

The ink composition of the embodiment may further include, in addition to the coloring agent, the organic solvent, water, the medium, the surfactant and the binder resin, other additives such as an antimold agent, a pH regulating agent, a chelating agent, an antirusting agent and an ultraviolet absorber.

For the antimold agent, there can be advantageously employed sodium dehydroacetate, sodium benzoate or sodium sorbinate.

For the pH regulating agent, there can be advantageously employed triethanolamine, sodium hydroxide, sodium carbonate, sodium nitrate or potassium nitrate.

The ink composition containing a coloring agent, an organic solvent, water and a surfactant which csatisfies with the above-mentioned condition has a viscosity preferably equal to or less than 20 mPa·s, more preferably equal to or less than 15 mPa·s at a measuring temperature of 25° C. A viscosity of the ink composition exceeding 20 mPa·s when employed in the ink jet recording method is incapable of achieving stable discharge of a liquid droplet of the ink composition. Consequently there is selected a range equal to or less than 20 mPa·s.

Figure 2:
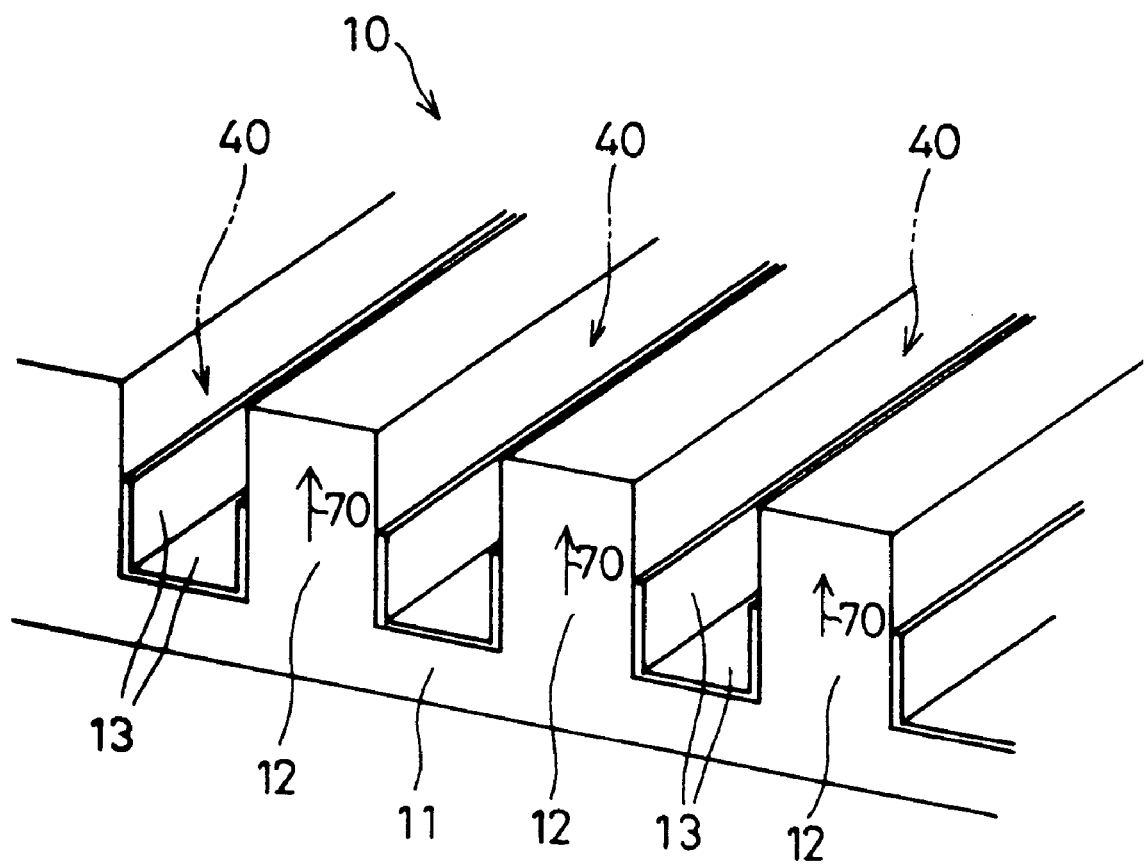
FIG. 2 is a partial magnified view showing the configuration of a head plate constituting the ink head shown in FIG. 1.

FIG. 1 is an exploded perspective view schematically showing the configuration of an ink head 1 constituting a second embodiment of the invention, and FIG. 2 is a partial magnified perspective view showing a head plate 10 constituting the ink head 1 shown in FIG. 1. A drive electrode 13 shown in FIG. 2 is omitted in FIG. 1 for the purpose of simplicity and ease of understanding.

The ink head 1 is constituted of a head plate 10 formed by a piezoelectric material and having a bottom wall part 11 and plural partitions 12; a top plate 20 provided on an upper surface of the partitions 12; a nozzle plate 30 including plural discharge ports 31 and provided at an end of the partitions 12; a rear plate (not shown) provided at the other end of the partitions 12; and an ink tank 50 provided on the top plate 20 and having an aperture 51. The plural partitions 12 are positioned mutually parallel with a predetermined pitch on the bottom wall part 11, and plural ink chambers 40 are formed by the plural partitions 12, the bottom wall part 11, the top plate 20, the nozzle plate 30 and the rear plate (not shown). In the top plate 20, there are formed a common ink supply path 21 communicating with the ink chambers 40, and an ink supply tube 22 connecting the common ink supply path 21 and the aperture 51 of the ink tank 50. The ink tank 50 stores an ink composition 60 of the first embodiment, the ink composition 60 is supplied to the ink chambers 40 through the common ink supply path 21.

Also as shown in FIG. 2, on surfaces, facing the ink chambers 40, of the bottom wall part 11 and the plural partitions 12 of the head plate 10, drive electrodes 13 for applying voltages to the plural partitions 12 are formed. The piezoelectric material constituting the plural partitions 12 is polarized in a direction indicated by arrows 70, whereby the plural partitions 12 function as piezoelectric elements.

The ink head 1 of such configuration is an ink head of piezo type capable of discharging liquid droplets of the ink composition 60 from the discharge ports 31, according to voltages applied to the plural partitions 12 constituting the piezoelectric elements.

Figure 3:
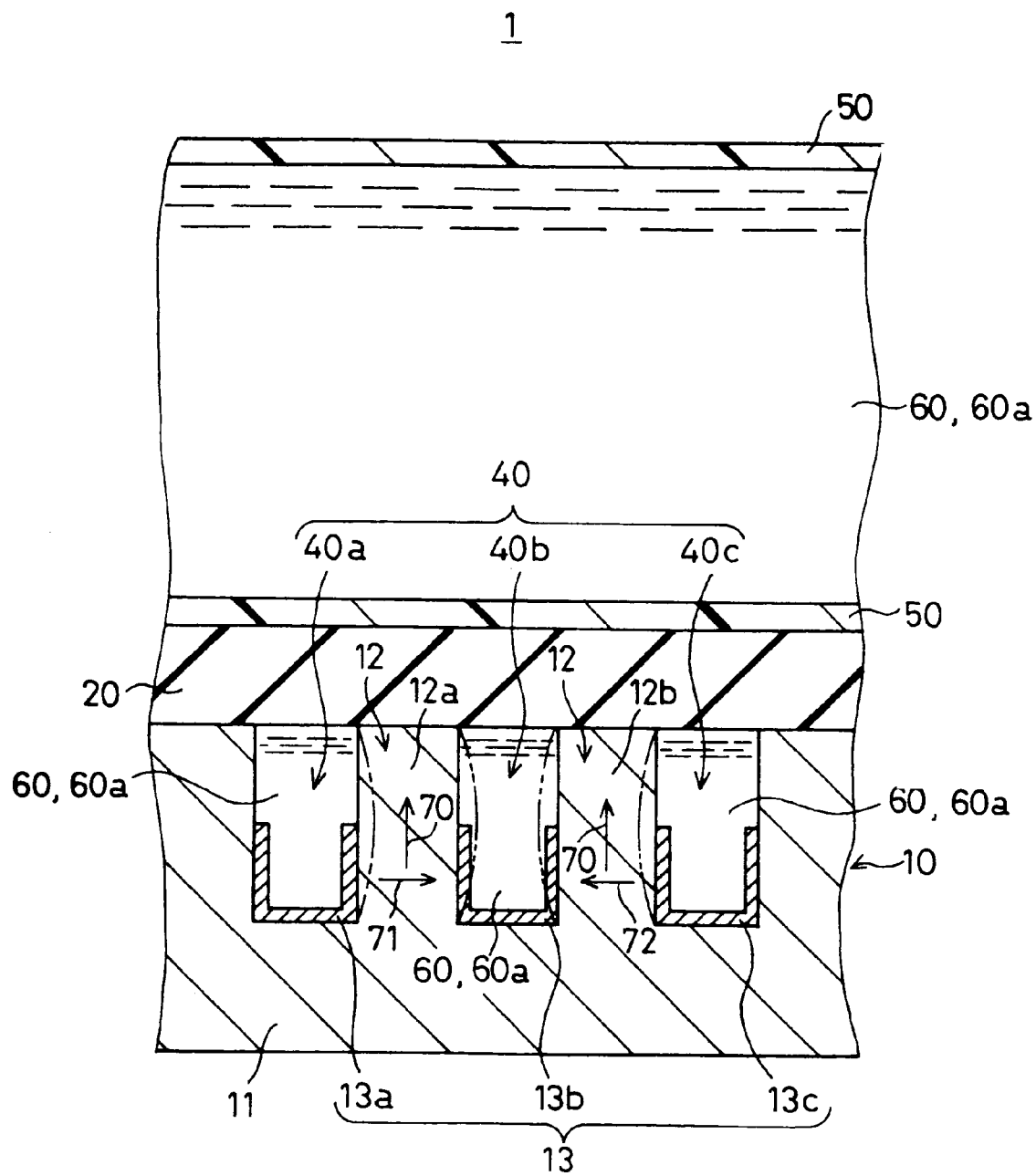
FIG. 3 is a cross-sectional view of the ink head shown in FIG. 1, seen from a direction of extension of an ink chamber.

In the following there will be explained a working principle of the ink head 1 at the discharge of the ink composition 60 from the ink chamber 40. FIG. 3 is a cross-sectional view of the ink head 1 shown in FIG. 1, seen from a direction of extension of the ink chamber 40. In the following there will be explained an operation in case the ink composition 60 is discharged from an ink chamber 40b.

In a state where a voltage is not applied to the partitions 12a and 12b constituting the ink chamber 40b, namely when a potential difference is not generated between a drive electrode 13b of the ink chamber 40b and a drive electrode 13a of an ink chamber 40a adjacent to the ink chamber 40b and between a drive electrode 13b of the ink chamber 40b and a drive electrode 13c of an ink chamber 40c adjacent to the ink chamber 40b, the ink chamber 40b is filled with the ink composition 60 supplied by a capillary action from the ink tank 50. Similarly, the ink chambers 40a, 40c are in a state filled with the ink composition 60.

When a voltage is applied to the drive electrodes 13a and 13c, there are generated potential differences between the drive electrode 13b and the drive electrode 13a, and between the drive electrode 13b and the drive electrode 13c, whereby a voltage is applied to the partitions 12a and 12b constituting the ink chamber 40b. This voltage generates electric fields in the partitions 12a and 12b respectively in directions indicated by arrows 71 and 72, and such electric fields function to generate strains in the partitions 12a and 12b constituting the ink chamber 40b, thus generating deformations convex to the ink chamber 40b. Thus a pressure wave is generated to apply a large pressure on the ink composition 60 filled in the ink chamber 40b, whereby a liquid droplet of the ink composition 60 is discharged from the discharge port 31 shown in FIG. 1.

When the voltage application to the drive electrodes 13a and 13c is terminated, the partitions 12a and 12b return to the original shape to restore the original volume of the ink chamber 40, whereby the ink composition 60 corresponding to the restored volume is supplied from the ink tank 50 through the common ink supply path 21 shown in FIG. 1, and the ink chamber 40b returns to the initial state filled with the ink composition 60.

The ink head 1 of the embodiment can stably discharge the liquid droplet of the ink composition 60a from the discharge port 31, since the ink tank 50 stores the ink composition 60a of the fourth embodiment as described above and such ink composition 60a is supplied to the ink chamber 40 and discharged as a liquid droplet from the discharge port 31. Such ink head can realize an ink jet recording apparatus of piezo type with a high reliability, and can provide a recorded image of a high quality stably.

In the embodiment, as explained in the foregoing, the partitions 12 constituting the ink chambers 40 are formed with a piezoelectric material and are caused to function as piezoelectric elements, but such configuration is not restrictive and it is also possible to form the partitions constituting the ink chambers with a non-piezoelectric material and to provide a piezoelectric element inside or outside the partition.

Figure 4:
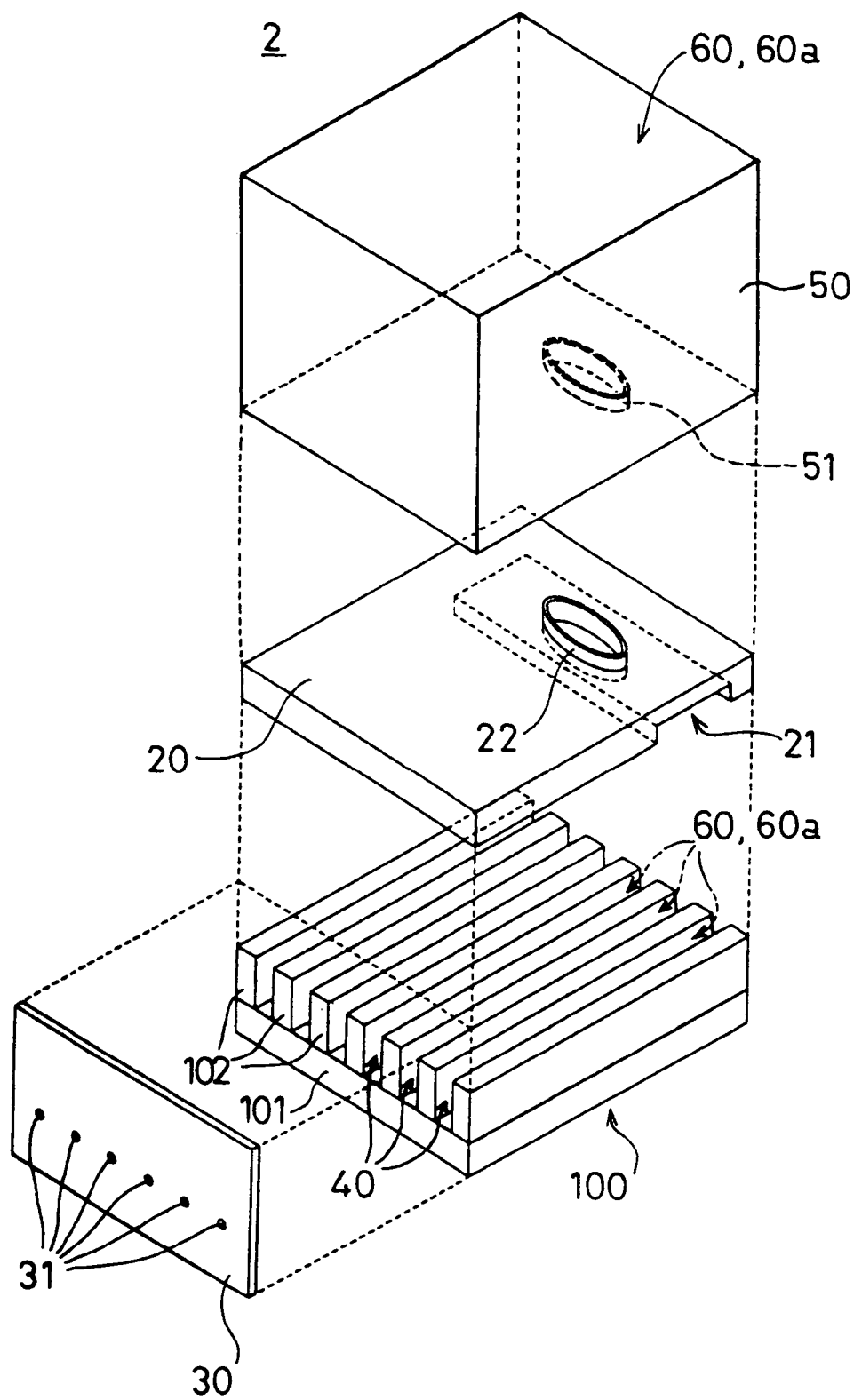
FIG. 4 is an exploded perspective view schematically showing the configuration of an ink head constituting a third embodiment of the invention.
Figure 5:
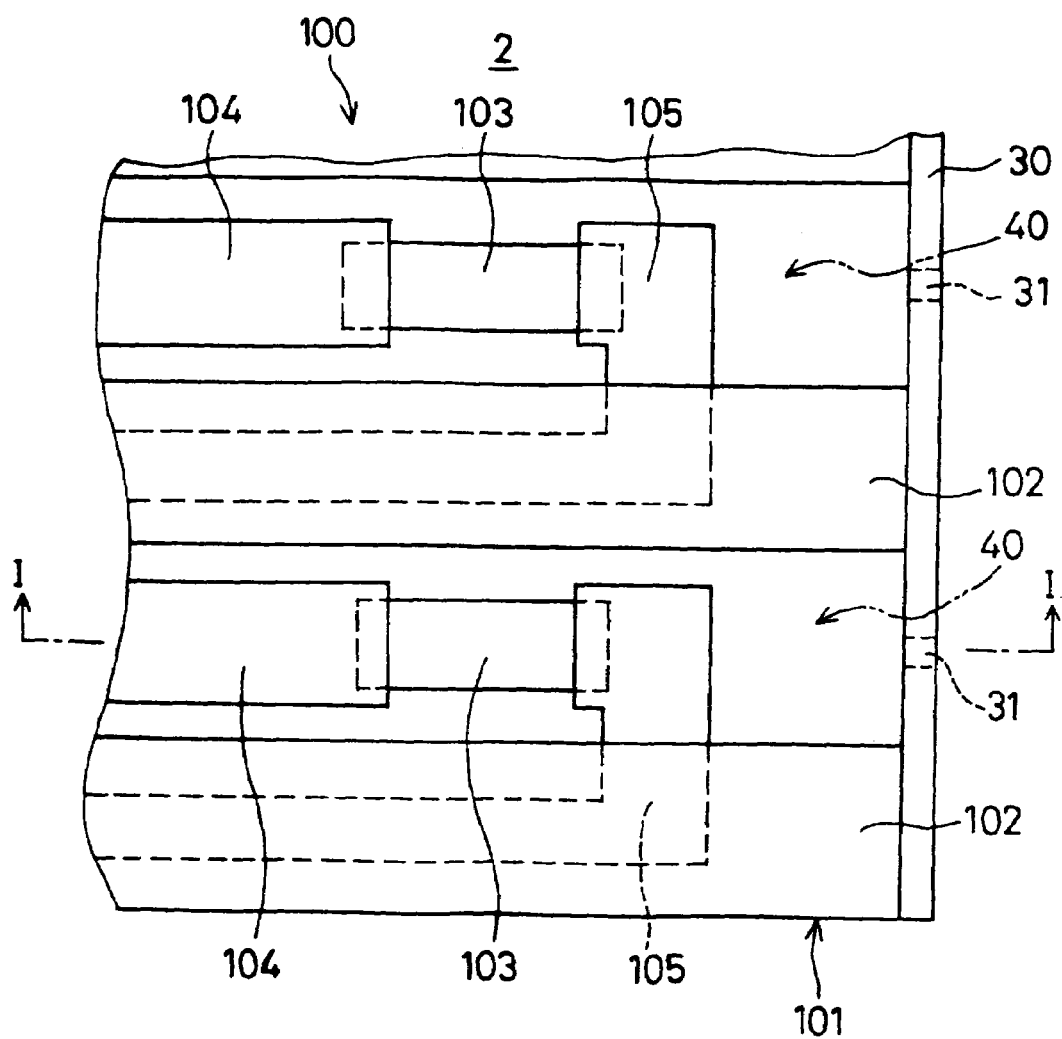
FIG. 5 is a partial plan view showing the configuration of the ink head shown in FIG. 4.

FIG. 4 is an exploded perspective view schematically showing the configuration of an ink head 2 constituting a third embodiment of the invention, and FIG. 5 is a partial plan view showing the configuration of the ink head 2 shown in FIG. 4. A top plate 20 and an ink tank 50 shown in FIG. 4 is omitted in FIG. 5 for the purpose of simplicity and ease of understanding. The ink head 2 of the embodiment is similar to the ink head 1 of the second embodiment, so that corresponding components are represented by same numbers and the explanation will be omitted.

It is to be noted that a head plate 100 includes a base plate 101, plural partitions 102 provided mutually parallel with a predetermined pitch on the base plate 101, heaters or heat-generating members 103 provided on a surface of the base plate 101 facing ink chambers 40, and drive electrodes 104, 105 for applying voltages to the heaters 103.

The ink head 2 of such configuration is an ink head of thermal ink jet type capable of discharging liquid droplets of the ink composition 60 from the discharge ports 31, according to voltages applied to the heaters 103 or the heat-generating members.

Figure 6:
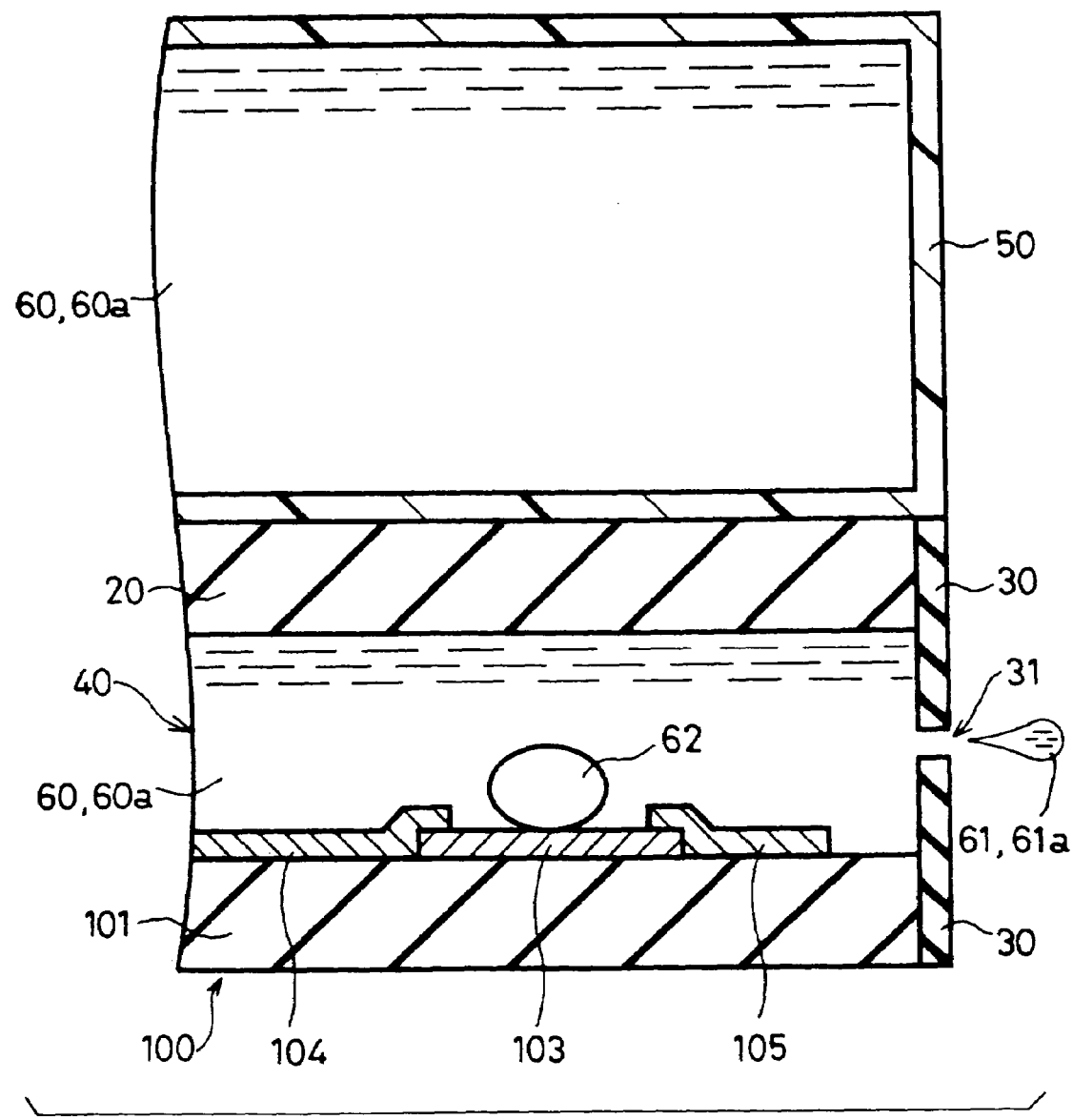
FIG. 6 is a schematic cross-sectional view showing a discharge state of a liquid droplet of an ink composition from an ink chamber.

In the following there will be explained a working principle of the ink head 2 at the discharge of the ink composition 60 from the ink chamber 40. FIG. 6 is a sectional view showing schematically the state in which a liquid droplet 61 of the ink composition 60 is discharged from the ink chamber 40. FIG. 6 shows a cross-sectional configuration of the ink head 2 shown in FIG. 5, along a cross-sectional line I-I.

When a voltage is not applied to the heater 103, similarly as in a state where a voltage is not applied to the partitions 12 in the ink head 1 of the second embodiment, the ink chamber 40 is filled with the ink composition 60.

When a voltage is applied to the heater 103 by the drive electrodes 104 and 105, the heater 103 generates heat to heat the ink composition 60 filled in the ink chamber 40, thereby generating a bubble 62. Thus a pressure wave is generated to apply a large pressure to the ink composition 60 filled in the ink chamber 40, thereby discharging the liquid droplet 61 of the ink composition 60 from a discharge port 31.

When the voltage application to the heater 103 is terminated, the ink composition 60 in the ink chamber 40 is cooled whereby the bubble 62 vanishes and the ink composition 60 corresponding to the restored volume is supplied from the ink tank 50 through the common ink supply path 21 shown in FIG. 4, and the ink chamber 40 returns to the initial state filled with the ink composition 60.

The ink head 2 of the embodiment can stably discharge the liquid droplet 61a of the ink composition 60a from the discharge port 31, since, like the ink head 1 of the second embodiment, the ink tank 50 stores the ink composition 60a of the fourth embodiment and such ink composition 60a is supplied to the ink chamber 40 and discharged as a liquid droplet 61a from the discharge port 31. Such ink head can realize an ink jet recording apparatus of thermal ink jet type with a high reliability, and can provide a recorded image of a high quality stably.

EXAMPLES

In the following the present invention will be further clarified by examples, but the invention is not limited by such examples. In the examples, an image recording may also be called a print or a printing.

The seven sorts of surfactants shown in Table 1 are respectively made dissolved in purified water as 0.1 wt % solution and surfactant solutions are prepared. Dynamic surface tension and static surface tension are measured for each of the prepared surfactant solutions according to the following explanation.

<Dynamic Surface Tension>

Measurement was made with a surface tension meter (BP-4: manufactured by Kyowa Kaimen Kagaku Co.), at a bubble frequency of 0.5 to 35 Hz.

<Static Surface Tension>

Measurement was made with a surface tension meter (CBVP-A3: manufactured by Kyowa Kaimen Kagaku Co.).

Table 1 shows measured values (mN/m) of dynamic surface tension ($\sigma_{10}$) and static surface tension ($\gamma$) of each of surfactant solutions at bubble frequency of 10 Hz, measuring temperature (° C.) at that time and a value of difference d1 ($\sigma_{10}-\gamma$) between $\sigma_{10}$ and $\gamma$. In addition, in Table 1, general formula (I) represents the surfactant represented by the above-mention4ed general formula (I), general formula (II) represents the surfactant represented by the above-mention4ed general formula (II), general formula (III) represents the surfactant represented by the above-mention4ed general formula (III), general formula (IV) represents the surfactant represented by the above-mention4ed general formula (IV), and general formula (V) represents the surfactant represented by the above-mention4ed general formula (V). Fluorinated surfactant 1 represents the surfactant represented by the following structural formula (VII). Fluorinated surfactant 2 represents the surfactant represented by the following structural formula (VIII).

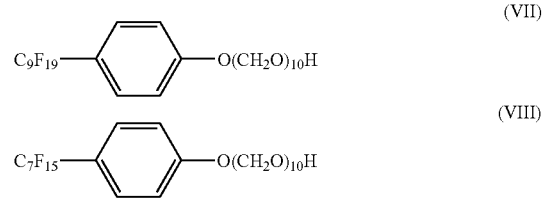

TABLE 1

| Surfactant | Dynamic surface tension $\sigma_{10}$ at 10 Hz(mN/m) | Measuring temperature (° C.) | Static surface tension $\gamma$ (mN/m) | Measuring temperature (° C.) | d1 (mN/m) |
|---|---|---|---|---|---|
| General formula (I) (m + n = 10) | 37.2 | 25.3-25.7 | 36.5 | 24.6 | 0.7 |
| General formula (II) (k = 11-13, l = 15) | 37.9 | 25.2-25.6 | 35.2 | 25.2 | 2.7 |
| General formula (III) (h + i = 9-11, j = 9) | 44.5 | 24.9-25.3 | 35.7 | 25.3 | 8.8 |
| General formula (IV) (w + z = 9-11, x = 9, y = 5) | 36.0 | 25.2-25.7 | 30.8 | 25.1 | 5.2 |
| General formula (V) (p = 12, q = 8, r = 4) | 40.0 | 24.8-25.2 | 39.3 | 25.5 | 0.7 |
| Fluorinated surfactant 1 | 64.7 | 25.0-25.4 | 18.7 | 25.6 | 46.0 |
| Fluorinated surfactant 2 | 64.3 | 25.1-25.6 | 16.2 | 25.5 | 48.1 |

<Ink Composition>

Using a surfactant shown in Table 1 gives ink compositions in the examples 1 to 7 including a surfactant having difference d1 ($\sigma_{10}-\gamma$) which is difference between dynamic surface tension ($\sigma_{10}$) of the solution obtained by making 0.1 wt % solution dissolved in purified water to be measured by using a maximum bubble pressure method at the bubble frequency of 10 Hz at a temperature from 24° C. to 26° C. and static surface tension ($\gamma$) to be measured at a temperature from 24° C. to 26° C. and which satisfies the above-mentioned expression (1) and also gives ink compositions in the comparative examples 1 to 4 not including the surfactant having difference d1 which satisfies the above-mentioned expression (1). Table 2 shows content of each component included in each ink composition in the examples 1 to 7 and the comparative examples 1 to 4. In Table 2, a value in each column is represented by parts by weight, and each of the ink compositions of the examples 1 to 7 and the comparative examples 1 to 4 has a total amount of 100 parts by weight. Also in Table 2, TEGBE represents triethylene glycol monobutyl ether; PEG400 represents polyethylene glycol with a molecular weight 400.

TABLE 2

| Composition | Example | | | | | | | Comparative Example | | | |
| --- | --- | --- | --- | --- | --- | --- | --- | --- | --- | --- | --- |
| | 1 | 2 | 3 | 4 | 5 | 6 | 7 | 1 | 2 | 3 | 4 |
| Coloring agent | | | | | | | | | | | |
| Dye | | | | | | | | | | | |
| C.I. Direct blue 199 | 2.5 | | | | | | | | | | |
| Pigment | | | | | | | | | | | |
| C.I. Pigment blue 15:3 | | 3 | | | | | | | | | |
| C.I. Pigment blue 15:4 | | | 3 | | | | | | | | |
| C.I. Pigment red 122 | | | | 5 | | | | | | | |
| C.I. Pigment yellow 74 | | | | | 4 | | | | | | |
| C.I. Pigment yellow 180 | | | | | | 4 | | | | | |
| carbon black | | | | | | | 5 | | | | 5 |
| C.I. Pigment blue 17 | | | | | | | | | 2 | | |
| C.I. Pigment red 58 | | | | | | | | | | 3 | |
| C.I. Pigment yellow 13 | | | | | | | | | | | 2 |
| Organic solvent | | | | | | | | | | | |
| diethylen glycol | 8 | 8 | 8 | 5 | 5 | 8 | 8 | 2 | 5 | 20 | 10 |
| Glycerin | 5 | 7 | 8 | 10 | 8 | 8 | 9 | 5 | 5 | 17 | 10 |
| 1,5-pentanediol | | | 2 | 5 | 2 | 2 | 5 | | 2 | 18 | 5 |
| TEGBE | 8 | 8 | 8 | 5 | 5 | 3 | 6 | 4 | | | 8 |
| PEG400 | | 1 | | | | | | 10 | 15 | 15 | 10 |
| Surfactant | | | | | | | | | | | |
| General formula (I) (m + n = 10) | 1 | | | | | | | | | | |
| General formula (II) (k = 11-13, l = 15) | | | 1 | | | | 1.0 | | | | |
| General formula (III) (h + i = 9-11, j = 9) | | | | | 1.5 | | | | | | |
| General formula (IV) (w + z = 9-11, x = 9, y = 5) | | | | | | 1.5 | | | | | |

TABLE 2-continued

| Composition | Example | | | | | | | Comparative Example | | | |
| --- | --- | --- | --- | --- | --- | --- | --- | --- | --- | --- | --- |
| | 1 | 2 | 3 | 4 | 5 | 6 | 7 | 1 | 2 | 3 | 4 |
| General formula (V) (p = 12, q = 8, r = 4) | | | | | | | 1 | | | | |
| Fluorinated surfactant 1 | | | | | | | | 1 | | | 0.5 |
| Fluorinated surfactant 2 | | | | | | | | | 1.5 | 1 | 0.5 |
| Binder resin | — | 1 | 1.5 | 2 | 1 | 1.5 | 1 | 1 | 1.5 | 2 | 2 |
| Polyester resin | | | | | | | | | | | |
| Water | R | R | R | R | R | R | R | R | R | R | R |

R: Remainder

The obtained ink compositions of the examples 1 to 7 and the comparative examples 1 to 4 were evaluated for the stability of discharge in case of use in the ink jet recording method and the image quality of the obtained recorded image in the following manner.

(Discharge Stability)

Each of the obtained ink compositions of the examples 8 to 14 and the comparative examples 5 to 8 was filled in an ink tank of an ink jet recording apparatus obtained by modifying a commercial ink jet recording apparatus (AJ2000: manufactured by Sharp Kabushiki Kaisha) so as that the ink head 1 shown in FIG. 1 could be mounted, and was printed continuously with a printing density of 5% on a copying ordinary paper (trade name: SF4AM3) manufactured by Sharp Kabushiki Kaisha at a printing speed of 7 A4-sized sheets per minute. In this test, the ink composition was filled again when the ink tank became empty, and the printing was continued until the printing became no longer possible by the failure of the discharge of the liquid droplets of the ink composition from the nozzle, and a number of the sheets completely printed up to this point was counted as a printable sheet number, as an index of evaluation of the discharge stability. The printable sheet number was evaluated as good (+) in case it exceeded 200, fair (±) in case it is from 150 to 200, and poor (−) in case it is less than 150.

(Image Quality)

Also each of the obtained ink compositions of the examples 8 to 14 and the comparative examples 5 to 8 was filled in an ink tank of an ink jet recording apparatus obtained by modifying a commercial ink jet recording apparatus (AJ2000: manufactured by Sharp Kabushiki Kaisha) so as that the ink head 1 shown in FIG. 1 could be mounted, and a specified pattern was printed on a copying ordinary paper (trade name: SF4AM3) manufactured by Sharp Kabushiki Kaisha to obtain an image for evaluation. After the evaluation image was left to stand for a day, a relative value of the line width of a pattern of each evaluation image, with respect to a pattern line width set as 100, was determined as an index for evaluating the image quality. The result was evaluated as good (+) in case the relative line width was less than 150 and there was almost no blotting, fair (±) in case the relative line width was from 150 to 250 with a blotting of a certain level, and poor (−) in case the relative line width exceeded 250 with a large amount of blotting.

These results of evaluation are shown in Table 3.

TABLE 3

|  | Examples | | | | | | | Comparative Examples | | | |
| --- | --- | --- | --- | --- | --- | --- | --- | --- | --- | --- | --- |
|  | 1 | 2 | 3 | 4 | 5 | 6 | 7 | 1 | 2 | 3 | 4 |
| Discharge stability | + | + | + | + | + | + | + | − | − | − | − |
| Image quality | + | + | + | + | + | + | + | − | − | − | − |

In the ink compositions of the examples 1 to 7, in which the difference d1 ($=\sigma_{10}-\gamma$) between the dynamic surface tension ($\sigma_{10}$) at the bubble frequency of 10 Hz and the static surface tension ($\gamma$) satisfies the expression (1), both the discharge stability and the image quality were good. On the other hand, in the ink compositions of the comparative examples 1 to 4 which do not include a surfactant having d1 satisfying the expression (1) and include a surfactant having a difference d1 larger than 15 and exceeding the range of the expression (1), both the discharge stability and the image quality were poor or fair.

As mentioned above, as to the difference d1 ($=\sigma_{10}-\gamma$) between the dynamic surface tension ($\sigma_{10}$) of the solution obtained by making 0.1 wt % solution dissolved in purified water at the bubble frequency of 10 Hz and the static surface tension ($\gamma$) of the solution, when a surfactant having d1 satisfying the expression (1) is made included in the solution and thereby the solution is applied to the ink jet recording method, it is rendered possible to obtain an ink composition excellent in the discharge stability and capable of suppressing blotting on the recording material thereby providing a recorded image of a high quality.

<Ink Set>

The ink compositions of examples 2 to 6 and comparative examples 1 to 3 were combined as ink compositions of cyan, magenta and yellow as shown in Table 4, to obtain an example ink set 1 in which the cyan ink composition includes at least either of pigment of C.I. Pigment blue 15:3 and C.I. Pigment blue 15:4, the magenta ink composition includes at least one pigment selected from a group of C.I. Pigment red 122, 209 and C.I. Pigment violet 19, and the yellow ink composition includes at least one pigment selected from a group of C.I. Pigment yellow 74, 138, 150 and 180, comparative example ink sets 1 to 3 in which one of the cyan, magenta and yellow ink compositions includes a pigment different from the aforementioned pigment, and a comparative example ink set 4 in which all the cyan, magenta and yellow ink compositions include pigments different from the aforementioned pigments.

TABLE 4

|  | Cyan | Magenta | Yellow |
| --- | --- | --- | --- |
| Example ink set 1 | Example 2 C.I. Pigment blue 15:3 | Example 4 C.I. Pigment red 122 | Example 5 C.I. Pigment yellow 74 |
| Comparative Example ink set 1 | Comparative Example 1 C.I. Pigment blue 17 | Example 4 C.I. Pigment red 122 | Example 5 C.I. Pigment yellow 180 |
| Comparative Example ink set 2 | Example 3 C.I. Pigment blue 15:4 | Comparative Example 2 C.I. Pigment red 58 | Example 6 C.I. Pigment yellow 180 |
| Comparative Example ink set 3 | Example 3 C.I. Pigment blue 15:4 | Example 4 C.I. Pigment red 122 | Comparative Example 3 C.I. Pigment yellow 13 |
| Comparative Example ink set 4 | Comparative Example 1 C.I. Pigment blue 17 | Comparative Example 2 C.I. Pigment red 58 | Comparative Example 3 C.I. Pigment yellow 13 |

Each of the obtained example ink set 1 and the comparative example ink sets 1 to 4 was used on an ink jet recording apparatus obtained by modifying a commercial ink jet recording apparatus (AJ2000: manufactured by Sharp Kabushiki Kaisha), and was printed on a glossy paper (trade name: AJ-K4AG) manufactured by Sharp Kabushiki Kaisha with a print ratio of the cyan, magenta and yellow ink compositions of 1:1:1 thereby forming a black image. Also the ink composition of the example 7 was employed as a black ink composition to obtain a same image.

Each of the obtained black image was measured with a spectrophotometer (X-Rite 938: manufactured by X-Rite Inc.) to obtain a luminance index L* and chromaticness indexes a* and b* in an L*a*b* color system (CIE: 1976).

Results of the test were evaluated as follows. Taking, in the black image formed with the ink composition of the example 7, the chromaticness indexes a* and b* respectively as A1 and B1, and, in the black images formed with the example ink set 1 and the comparative example ink sets 1 to 4, the chromaticness indexes a* and b* respectively as A2 and B2, a value Δa*b* represented by a following equation (B) was determined as an index for evaluating the black color reproducibility:

$$\Delta a^*b^* = \{(A1-A2)^2 + (B1-B2)^2\}^{1/2} \quad (B).$$

A case with a value of Δa*b* equal to or less 20 (Δa*b*≦20) was evaluated as good (+), while a case exceeding 20 (Δa*b*>20) was evaluated as poor (−). Results of evaluation are shown in Table 5.

TABLE 5

|  | Evaluation result |
| --- | --- |
| Example ink set 1 | + |
| Comparative Example ink set 1 | − |
| Comparative Example ink set 2 | − |
| Comparative Example ink set 3 | − |
| Comparative Example ink set 4 | − |

Table 5 indicates that the black image formed by superposing three ink compositions contained in the example ink set 1 had a higher density closer to that of the black image formed with the ink composition of the example 7, in comparison with the black images formed by superposing three ink compositions contained in each of the comparative example ink sets 1 to 4. It is thus identified that the example ink set 1 has a better black color reproducibility and is superior in the color balance, in comparison with the comparative example ink sets 1 to 4.

As explained in the foregoing, by superposing a cyan ink composition including at least either of pigment of C.I. Pigment blue 15:3 and C.I. Pigment blue 15:4, a magenta ink composition including at least one pigment selected from the group consisting of C.I. Pigment red 122, 209 and C.I. Pigment violet 19, and a yellow ink composition including at least one pigment selected from the group consisting of C.I. Pigment yellow 74, 138, 150 and 180, in this manner an ink set with an excellent color balance could be obtained.

The ink composition which is a forth embodiment in the invention includes coloring agent, an organic solvent, water and a surfactant having difference d2 ($\sigma_{10}-\sigma_1$) which is difference between dynamic surface tension ($\sigma_{10}$) measured at the bubble frequency of 10 Hz among dynamic surface tensions of the solution obtained by making 0.1 wt % solution dissolved in purified water to be measured by using a maximum bubble pressure method at a temperature from 24° C. to 26° C. and dynamic surface tension ($\sigma_1$) to be measured at the bubble frequency of 1 Hz and which satisfies the following expression (2).

$$0 \text{ mN/m} \leq d2 \leq 15 \text{ mN/m} \quad (2)$$

Herein, the purified water means water having electric resistance rate more than $0.1 \times 10^6$ Ω·cm at 25° C. The electric resistance rate more than $0.1 \times 10^6$ Ω·cm corresponds to electric conductivity equal to or less than 10 μm/cm according to representation of electric conductivity.

The maximum bubble pressure method used for measuring the dynamic surface tension will be explained in the following.

The maximum bubble pressure method is a method for determining a surface tension by inserting a fine tube into a liquid, generating a bubble from an front end of the fine tube thereby forming a liquid-gas interface in the liquid, measuring a pressure difference value ΔP when the pressure difference between the interior and the exterior of the bubble becomes maximum, namely when the radius of the bubble becomes equal to the radius r of the fine tube, and determining a surface tension a from such value. The surface tension σ is determined from a following equation (C).

$$\sigma = \Delta P \cdot r / 2 \quad (C)$$

By changing a bubble frequency, which is a number of generation of bubbles per unit time, it is possible to determine the dynamic surface tension from a state of slow motion to a state of fast motion. It is possible to evaluate a change in the dynamic property of the liquid, by determining the dynamic surface tension from a state of slow motion to a state of fast motion.

An ink composition of the embodiment can be employed in a recording method for recording an image by depositing the ink composition onto a recording material, for example in an ink jet recording method or recording method with a writing utensil such as a pen. Use of the ink composition of the embodiment allows to obtain a recorded image of a high quality in a stable manner.

The ink composition of the embodiment is advantageously employed in an ink jet recording method among the above-mentioned recording methods. In the ink jet recording method, a pressure is applied to the ink composition to discharge a liquid droplet of the ink composition, and such liquid droplet is deposited on a recording material to record an image. The ink composition in the embodiment is used for the ink jet recording method and thereby stable discharge can be performed and a recorded image of a high quality can be stably provided.

In an ink jet recording apparatus for recording an image by the ink jet recording method, at successive discharges of liquid droplets of the ink composition, a new surface of the ink composition is generated incessantly at a discharge port, provided at an front end of an ink chamber in an ink head, so that the motion of the ink composition is fast and the dynamic surface tension at high frequency of approximately 10 Hz corresponding to dynamic surface tension in a state of fast motion has a large influence. On the other hand, in the ink chamber, after the discharge of the ink composition, the ink composition is supplied by a capillary action from an ink tank by an amount corresponding to a volume decreased by the discharge, so that the motion of the ink composition is slow and the dynamic surface tension at low frequency of approximately 10 Hz corresponding to dynamic surface tension in a state of slow motion has a large influence. Thus, since both the dynamic surface tension of the ink composition at the higher frequency and the dynamic surface tension of the ink composition at the lower frequency exert influences in the discharge, it is necessary to consider a balance of the dynamic surface tension at high frequency and the dynamic surface tension at low frequency in order to achieve stable discharge of the liquid droplets of the ink composition. Also at the image recording by depositing a liquid droplet of the ink composition onto the recording material, the motion of the ink composition is fast at a moment of landing of the liquid droplet on the recording material, but thereafter becomes gradually slower. When the recording material is absorbent recording material, the ink composition slowly penetrates into the recording material. In other words, since the surface tension of the ink composition changes from dynamic surface tension in a state of fast motion to static surface tension in a state of slow motion, a large difference between the dynamic surface tension at the higher frequency and the dynamic surface tension at the lower frequency requires a long time for drying of the ink composition on the recording material, thus resulting in a blotting or an excessive permeation leading to a rear penetration. Thus, in the ink jet method, relationship between the dynamic surface tension of the ink composition at the higher frequency and the dynamic surface tension of the ink composition at the lower frequency is important.

The dynamic surface tension and the static surface tension of the ink composition are changed by a kind and a content of the organic solvent included in the ink composition, but are most significantly affected by the surfactant. In other words, the dynamic surface tension of the ink composition can be controlled by the surfactant and therefore relationship between dynamic surface tension of the ink composition at the higher frequency and static surface tension of the ink composition at the lower frequency can be controlled by defining nature of the surfactant to be included in the ink composition. Consequently, as mentioned above, as to a surfactant having difference d2 ($\sigma_{10}-\sigma_1$) which is difference between the dynamic surface tension ($\sigma_{10}$) of the solution obtained by making 0.1 wt % solution dissolved in purified water at bubble frequency 10 Hz and the dynamic surface tension ($\sigma_1$) and which satisfies the following expression (2), relationship between the dynamic surface tension of the ink composition at the higher frequency and the static surface tension of the ink composition at the lower frequency can be made preferable by making the surfactant included in the ink composition. Therefore, when the ink composition is applied to the ink jet recording method, it is rendered possible to obtain an ink composition excellent in the discharge stability and capable of suppressing blotting on the recording material thereby providing a recorded image of a high quality.

In the following there will be explained a reason for restricting a design range in the ink composition of the embodiment.

In case $\sigma_{10}$ and $\sigma_1$ have a difference d2 ($=\sigma_{10}-\sigma_1$) exceeding 15 mN/m, the dynamic surface tension at the higher frequency and the dynamic surface tension at the lower frequency become ill-balanced whereby the liquid droplet cannot be discharged in a stable state. Also the drying on the recording material takes time and generates blotting, thereby deteriorating the image quality. Consequently a condition equal to or less than 15 mN/m is selected.

In case $\sigma_{10}$ and $\sigma_1$ have a difference d2 (=$\sigma_{10}-\sigma_1$) less than 0 mN/m, the dynamic surface tension at the lower frequency becomes high to deteriorate the wetting property of the ink composition on the components constituting the ink head, whereby the filling of the ink composition into the ink chamber becomes hindered. Consequently a condition equal to or larger than 0 mN/m is selected.

The dynamic surface tension ($\sigma_{10}$) at the bubble frequency of 10 Hz and the dynamic surface tension ($\sigma_1$) at the bubble frequency of 1 Hz are preferably within a range from 20 to 70 mN/m, more preferably from 20 to 45 mN/m.

In case $\sigma_{10}$ and $\sigma_1$ are less than 20 mN/m, the dynamic surface tension of the ink composition at the higher frequency and the dynamic surface tension of the ink composition at the lower frequency become excessively low and therefore, permeability to the absorbent recording material becomes excessively high, whereby the ink composition upon being deposited on the absorbent recording material spreads from a landing point to a surrounding area thereby providing an unclear contour in a formed image. Also in case $\sigma_{10}$ and $\sigma_1$ exceed 70 mN/m, the permeability to the absorbent recording material becomes excessively low, whereby a drying property is lowered on the absorbent recording material. Also the ink composition shows a lowered wetting property on the inner wall of the ink chamber to hinder the supply of the ink composition into the ink chamber, whereby the ink composition cannot be smoothly filled in the ink chamber and cannot be discharged stably in the liquid droplets. Also it becomes difficult to form a newly generated surface of the ink composition in a desired form in the discharge port provided at the front end of the ink chamber, namely difficult to control the meniscus, whereby the discharge of liquid droplets of the ink composition in successive manner at a high speed becomes impossible. Consequently, $\sigma_{10}$ and $\sigma_1$ are defined as values from 20 mN/m to 70 mN/m.

The surfactant satisfying the above-mentioned condition may be a nonionic surfactant, an anionic surfactant, a cationic surfactant, or a combination thereof. The type of the surfactant, such as nonionic, cationic or anionic, is selected according to the type of an electrolyte contained in the ink composition. For example, in case the ink composition includes an anionic substance, there is employed a nonionic or anionic surfactant. Also, these surfactants may be used in combination with each other. At that time, sorts of nonionic, anionic or cationic surfactants may be the same or different.

Specific examples of the surfactant satisfying the above-mentioned condition include the surfactants represented by following general formulas (IX), (X), (XI), (XII), (XIII) and (XIV), but the surfactant is not limited by these examples.

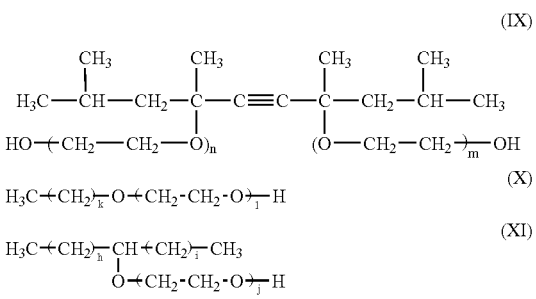

(IX)

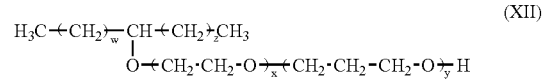

(X)

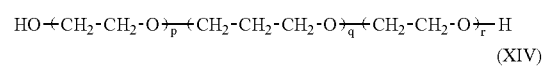

(XI)

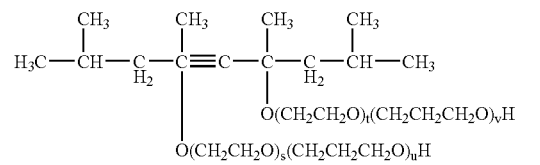

(XII)

(XIII)

(XIV)

In the general formula (IX), m represents an integer or a fractional number from 0 to 30; n represents an integer or a fractional number from 0 to 30; and a sum of m and n (m+n) represents an integer or a fractional number from 0 to 30.

In the general formula (X), k represents an integer or a fractional number from 11 to 13; and l represents an integer or a fractional number from 3 to 30.

In the general formula (XI), h represents an integer or a fractional number from 0 to 11; i represents an integer or a fractional number from 0 to 11; j represents an integer or a fractional number from 3 to 50; and a sum of h and i (h+i) represents an integer or a fractional number from 9 to 11.

In the general formula (XII), w represents an integer or a fractional number from 0 to 11; x represents an integer or a fractional number from 5 to 9; y represents an integer or a fractional number from 2.5 to 5; z represents an integer or a fractional number from 0 to 9; and a sum of w and z (w+z) represents an integer or a fractional number from 9 to 11.

In the general formula (XIII), p represents an integer or a fractional number from 0 to 78; q represents an integer or a fractional number from 2 to 15; and r represents an integer or a fractional number from 0 to 18.

In the general formula (XIV), s represents an integer or a fractional number from 0 to 30; t represents an integer or a fractional number from 0 to 30; and a sum of s and t (s+t) represents an integer or a fractional number from 0 to 30. Also u represents an integer or a fractional number from 0 to 10; v represents an integer or a fractional number from 0 to 10; and a sum of u and v (u+v) represents an integer or a fractional number from 0 to 10.

Among the surfactants, a nonionic surfactant is less susceptible to an influence of a co-existing electrolyte and relationship between the dynamic surface tension and the static surface tension of the ink composition, which are controlled by the surfactant, can be made preferable regardless whether an electrolyte is added to the ink composition and therefore it is preferable that this nonionic surfactant is used as the surfactant of the invention.

The surfactant satisfying the above-mentioned condition is preferably included in the ink composition at a critical micelle concentration or higher. The surface tension of a solution containing a surfactant decreases with an increase in the surfactant up to the critical micelle concentration, but remains substantially constant above the critical micelle concentration. Therefore, by employing the surfactant at or above the critical micelle concentration as explained above, it is possible to fully exploit the effect of the surfactant and to maintain the dynamic surface tension of the above-mentioned ink composition at the higher frequency and the dynamic surface tension of the above-mentioned ink composition at the lower frequency, controlled by the surfactant, at substantially constant values, whereby an ink composition having uniform properties can be obtained.

The critical micelle concentration, though different for each surfactant, is about 0.001 to 3 wt. % (measuring temperature: 25° C.), for any of the nonionic surfactant, the anionic surfactant and the cationic surfactant.

The ink composition of the embodiment may include not only the surfactant satisfying the above-mentioned condition, but also another surfactant not satisfying the above-mentioned condition.

The ink composition of the embodiment preferably includes water. Such composition allows to suppress blotting on the recording material and to improve the drying property.

A water content in the ink composition is preferably from 30 to 95 wt. %, more preferably 30 to 85 wt. %. A water content less than 30 wt. % results in an excessively large amount of the organic solvent in the ink composition, and it becomes difficult to exist stably an ink additive which is soluble or dispersible in water in the ink composition. Also there results a significant increase in the viscosity, which eventually comes out of an appropriate viscosity range of the ink composition. Also a water content exceeding 95 wt. % excessively reduces the amount of the organic solvent, whereby the wetting property of the ink composition cannot be maintained. Consequently there is selected a range of 30 to 95 wt. %.

Specific examples of the organic solvent include an amide such as dimethylformamide or dimethylacetamide; polyhydric alcohol such as polyethylene glycol, polypropylene glycol, ethylene glycol, diethylene grlycol, thiodiglycol, propylene glycol, triethylene glycol, 1,5-pentanediol, 1,4-butanediol, 1,2-hexanediol, 1,3-propanediol, glycerin or 1,2, 6-hexanetriol; an ether of polyhydric alcohol such as glycol ether such as ethylene glycol monomethyl ether, ethylene glycol monobutyl ether, diethylene glycol monomethyl ether, diethylene glycol monoethyl ether, triethylene glycol monobutyl ether, propylene glycol monoethyl ether, tetraethylene glycol monomethyl ether or ethylene glycol monophenyl ether; a sulfur-containing compound such as sulforane or dimethyl sulfoxide; a nitrogen-containing compound such as 2-pyrrolidone, N-methylpyrrolidone or ε-caprolactam, an oxygen-containing compound such as γ-butyrolactone; and a polyfunctional compound such as dimethylamino ethanol, diethylamino ethanol, triethanolamine or morpholine, but the organic solvent is not limited to such examples. These organic solvents may be used singly or in a mixture of two or more kinds.

Among these organic solvents, it is preferred to utilize a glycol ether or a polyhydric alcohol since such solvent has a low vapor pressure and provides a wetting effect when contained in the ink composition, thereby improving the stability of discharge. The medium preferably contains at least one of glycol ethers and polyhydric alcohols. Among the glycol ethers and the polyhydric alcohols, it is more preferred to employ, as the medium, diethylene glycol monobutyl ether, propylene glycol monobutyl ether, triethylene glycol monobutyl ether, or tetraethylene glycol monobutyl ether as a glycol ether, or glycerin, 1,2-hexane diol or 1,5-pentane diol as a polyhydric alcohol, as they have a vapor pressure of 0.05 mmHg or less at 25° C. and being excellent in wetting effect.

The organic solvent in the ink composition has a content preferably from 3 to 70 wt. %, more preferably 3 to 50 wt. %. A content of the organic solvent less than 3 wt. % results in a fast drying of the ink composition and is difficult to maintain the wetting property. Also in case a content of the organic solvent exceeds 70 wt. %, a water-soluble or water-dispersible ink additive may not be able to present stably. Also, depending upon the kind of the employed organic solvent, the viscosity shows a significant increase and exceeds an appropriate viscosity range of the ink composition. Consequently there is selected a range of 3 to 70 wt. %. However, in case the ink composition includes water as a principal component, the content of the organic solvent in the ink composition is preferably 3 to 40 wt. %, more preferably 3 to 30 wt. %. In case the ink composition includes water as a principal component and the content of the organic solvent exceeds 40 wt. %, there result a deterioration of the print quality of the obtained recording image and a delay in the drying time of the ink composition, though dependent on the kind of the employed coloring agent. Consequently there is selected a range of 3 to 40 wt. %.

The coloring agent can be a dye, a pigment or a mixture thereof. The dye or the pigment can be a substance containing the dye or pigment or a substance on which the dye or pigment is deposited.

Use of a dye as the coloring agent allows to suppress a clogging thereby improving the stability of discharge. Also use of a pigment as the coloring agent allows to obtain a recorded image excellent in light fastness and water resistance.

For reproducing various colors in a full-color ink jet recording method, there are employed ink compositions of three colors which as cyan (abbreviated as C), magenta (abbreviated as M) and yellow (abbreviated as Y), and various colors can be represented by mixing these ink compositions. However, since a black color is difficult to reproduce by mixing of the three colors, there is usually employed an ink composition of black color (abbreviated as B) for representing black color. There can be obtained an ink composition of cyan, magenta, yellow or black by changing the color of the included coloring agent.

The dye is advantageously employed a water-soluble dye such as an acidic dye, a direct dye, a reactive dye or a food dye. It is preferred, among these, to employ a dye excellent in water resistance, light fastness or safety.

Specific examples of the dye include following dyes, but the dye is not limited to such examples. In the following, dyes are represented by Color Index (C.I.) numbers.

Examples of the dye employable in the cyan ink composition include acidic dyes such as C.I. Acid blue 7, 9, 29, 45, 92 and 249; direct dyes such as C.I. Direct blue 1, 2, 6, 15, 22, 25, 71, 76, 79, 86, 90, 98, 163, 165, 199 and 202; and reactive dyes such as C.I. Reactive blue 1, 2, 7, 14, 15, 23, 32, 38, 41, 63, 80 and 95. It is preferred to employ, among these, at least one dye selected from a group of C.I. Acid blue 7 and 9 and C.I. Direct blue 199.

Examples of the dye employable in the magenta ink composition include acidic dyes such as C.I. Acid red 1, 8, 13, 14, 18, 26, 27, 35, 37, 42, 52, 82, 87, 89, 92, 97, 106, 111, 114, 115, 134, 186, 249, 254 and 289; direct dyes such as C.I. Direct red 1, 4, 9, 13, 17, 20, 28, 31, 39, 80, 81, 83, 89, 225 and 227, C.I. Direct orange 26, 29, 62 and 102; and reactive dyes such as C.I. Reactive red 1, 14, 17, 25, 26, 32, 37, 44, 46, 55, 58, 60, 66, 74, 79, 96, 97, 141, 147, 180 and 181. It is preferred to employ, among these, at least one dye selected from a group of C.I. Acid red 52 and 289, and C.I. Reactive red 58, 141 and 180.

Examples of the dye employable in the yellow ink composition include acidic dyes such as C.I. Acid yellow 1, 7, 17, 23, 42, 44, 79 and 142; direct dyes such as C.I. Direct yellow 1, 12, 24, 26, 33, 44, 50, 86, 120, 132, 142 and 144;

and reactive dyes such as C.I. Reactive yellow 1, 5, 11, 13, 14, 20, 21, 22, 25, 40, 47, 51, 55, 65 and 67. It is preferred to employ, among these, at least one dye selected from a group of C.I. Acid yellow 17 and 23, and C.I. Direct yellow 86.

Examples of the dye employable in the black ink composition include food dyes such as C.I. Food black 2; direct dyes such as C.I. Direct black 19, 22, 32, 38, 51, 56, 71, 74, 75, 77, 154, 168 and 171; and reactive dyes such as C.I. Reactive black 3, 4, 7, 11, 12 and 17. It is preferred to employ, among these, at least either of C.I. Food black 2 and C.I. Direct black 154.

These dyes are employed within a stably soluble range at the normal temperature. Since such range is different for each dye, a content of the dye in the ink composition is not particularly limited, but is preferably 0.1 to 10 wt. %.

As to the pigment, there can be employed any pigment dispersible in a solution, but there is advantageously employed a pigment excellent in light fastness or safety.

Specific examples of the pigment include following pigments, but the pigment is not limited to such examples. In the following, pigments are represented by Color Index (C.I.) numbers.

Examples of the pigment employable in the cyan ink composition include C.I. Pigment blue 1, 2, 15, 16, 17, 21, 22, 60 and 64.

Examples of the pigment employable in the magenta ink composition include C.I. Pigment red 2, 3, 5, 16, 23, 31, 49, 57, 63, 122 and 209, and C.I. Pigment violet 19.

Examples of the pigment employable in the yellow ink composition include C.I. Pigment yellow 1, 2, 3, 5, 12, 74, 138, 150 and 180.

Examples of the pigment employable in the black ink composition include carbon black such as channel black, furnace black, thermal black or lamp black.

Among these pigments, it is preferred to employ, in the cyan ink composition, at least either of C.I. Pigment blue 15:3 and 15:4. For the magenta ink composition it is preferred to employ at least one pigment selected from a group of C.I. Pigment red 122, C.I. Pigment red 209, and C.I. Pigment violet 19. Also for the yellow ink composition it is preferred to employ at least one pigment selected from a group of C.I. Pigment yellow 74, C.I. Pigment yellow 138, C.I. Pigment yellow 150 and C.I. Pigment yellow 180. For the black ink composition it is preferred to employ at least one pigment selected from the aforementioned carbon blacks. By employing these pigments, there can be obtained an ink composition capable of realizing a recorded image excellent in cyan, magenta, yellow or black color formation.

It is also possible to obtain a black recorded image of a high density, close to a recorded image formed with a black ink composition, by superposing these three ink compositions of cyan, magenta and yellow colors employing these preferred pigments, namely a cyan ink composition in which the pigment includes at least either of C.I. Pigment blue 15:3 and C.I. Pigment blue 15:4; a magenta ink composition in which the pigment includes at least one selected from a group of C.I. Pigment red 122, C.I. Pigment red 209 and C.I. Pigment violet 19, and a yellow ink composition in which the pigment includes at least one selected from a group of C.I. Pigment yellow 74, C.I. Pigment yellow 138, C.I. Pigment yellow 150 and C.I. Pigment yellow 180. Thus the ink set including the aforementioned three ink compositions provides an excellent color balance. Therefore various colors can be represented by employing an ink set including these three ink compositions or an ink set including four ink compositions, namely these three ink compositions and a black ink composition employing carbon black, whereby a full-color recorded image with an excellent color formation can be provided.

In case the ink composition contains water, the pigment preferably has one or plural hydrophilic groups selected from a group for example of a carboxyl group, a hydroxyl group, an amino group and a sulfonic acid group. Such hydrophilic group may be introduced directly to the surface of the pigment by a chemical modification, or introduced by covering the surface of the pigment with a polymer having such hydrophilic group thereby achieving a hydrophilic property. Also such hydrophilic group may be in a form of a salt.

The pigment having the hydrophilic group can be stably dispersed in an ink composition containing water. Therefore, by employing a pigment having a hydrophilic group as the coloring agent, it is possible to suppress the clogging, thereby obtaining a recorded image excellent in light fastness and water resistance without deteriorating the stability of discharge.

These pigments are employed within a stably dispersible range at the normal temperature. Since such range is different for each pigment, a content of the pigment in the ink composition is not particularly limited, but is preferably 0.1 to 10 wt. %.

The ink composition of the embodiment preferably includes a binder resin in case a pigment is employed as the coloring agent. Presence of a binder resin allows to prevent peeling of the pigment from the recording material.

As the binder resin, there is employed one or more selected from a group for example of a polyester resin, an acrylic resin, a styrene-acrylic copolymer resin and a polyester-acrylic copolymer resin.

The ink composition of the embodiment may further include, in addition to the coloring agent, the organic solvent, water, the medium, the surfactant and the binder resin, other additives such as an antimold agent, a pH regulating agent, a chelating agent, an antirusting agent and an ultraviolet absorber.

For the antimold agent, there can be advantageously employed sodium dehydroacetate, sodium benzoate or sodium sorbinate.

For the pH regulating agent, there can be advantageously employed triethanolamine, sodium hydroxide, sodium carbonate, sodium nitrate or potassium nitrate.

The ink composition containing at least a coloring agent, an organic solvent, water and a surfactant satisfying the above-mentioned condition has a viscosity preferably equal to or less than 20 mPa·s, more preferably equal to or less than 15 mPa·s at a measuring temperature of 25° C. A viscosity of the ink composition exceeding 20 mPa·s when employed in the ink jet recording method is incapable of achieving stable discharge of a liquid droplet of the ink composition. Consequently there is selected a range equal to or less than 20 mPa·s.

The ink composition of the fourth embodiment of the invention is used for an ink head 1 shown in FIG. 1-FIG. 3. The ink head 1 of the embodiment can stably discharge the liquid droplet of the ink composition 60a from the discharge port 31, since the ink tank 50 stores the ink composition 60a of the fourth embodiment as described above and such ink composition 60a is supplied to the ink chamber 40 and discharged as a liquid droplet from the discharge port 31. Such ink head can realize an ink jet recording apparatus of piezo type with a high reliability, and can provide a recorded image of a high quality stably.

Also, the ink composition of the fourth embodiment of the invention is used for an ink head 2 shown in FIG. 4-FIG. 6. The ink head 2 of the embodiment can stably discharge the liquid droplet 61a of the ink composition 60a from the discharge port 31, since, like the ink head 1 of the second embodiment, the ink tank 50 stores the ink composition 60a of the fourth embodiment and such ink composition 60a is supplied to the ink chamber 40 and discharged as a liquid droplet 61a from the discharge port 31. Such ink head can realize an ink jet recording apparatus of thermal ink jet type with a high reliability, and can provide a recorded image of a high quality stably.

EXAMPLES

In the following the present invention will be further clarified by examples, but the invention is not limited by such examples. In the examples, an image recording may also be called a print or a printing.

The seven sorts of surfactants shown in Table 1 are respectively made dissolved in purified water as 0.1 wt % solution and surfactant solutions are prepared. Dynamic surface tension and static surface tension are measured for each of the prepared surfactant solutions according to the following explanation.

<Dynamic Surface Tension>

Measurement was made with a surface tension meter (BP-4: manufactured by Kyowa Kaimen Kagaku Co.), at a bubble frequency of 0.5 to 35 Hz.

Table 6 shows measured values (mN/m) of dynamic surface tension ($\sigma_{10}$) of each of surfactant solution at bubble frequency of 10 Hz and dynamic surface tension ($\sigma_1$) of each of surfactant solution at bubble frequency of 1 Hz, a value (mN/m) of difference d2 ($\sigma_{10}-\sigma_1$) and measuring temperature (° C.) at that time. In addition, in Table 6, general formula (IX) represents the surfactant represented by the above-mention4ed general formula (IX), general formula (X) represents the surfactant represented by the above-mention4ed general formula (X), general formula (XI) represents the surfactant represented by the above-mention4ed general formula (XI), general formula (XII) represents the surfactant represented by the above-mention4ed general formula (XII), general formula (XIII) presents the surfactant represented by the above-mention4ed general formula (XIII), general formula (XIV) presents the surfactant represented by the above-mention4ed general formula (XIV). Fluorinated surfactant represents the surfactant represented by the following structural formula (XV). Fluorinated surfactant 2 presents the surfactant represented by the following structural formula (XVI).

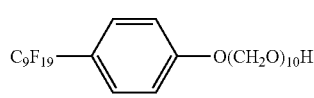
(XV)

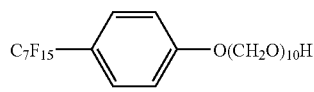
(XVI)

TABLE 6

| Surfactant | Dynamic surface tension $\sigma_{10}$ at 10 Hz (mN/m) | Dynamic surface tension $\sigma_1$ at 1 Hz (mN/m) | d2 (mN/m) | Measuring temperature (° C.) |
| --- | --- | --- | --- | --- |
| General formula (IX) (m + n = 10) | 37.1 | 35.1 | 2.0 | 24.3–24.7 |
| General formula (X) (k = 11-13, l = 15) | 43.0 | 37.0 | 6.0 | 25.6–26.0 |
| General formula (XI) (h + i = 9-11, j = 9) | 44.4 | 38.0 | 6.4 | 24.9–25.4 |
| General formula (XII) (w + z = 9-11, x = 9, y = 5) | 40.2 | 38.2 | 2.0 | 25.2–25.6 |
| General formula (XIII) (p = 12, q = 8, r = 4) | 40.6 | 38.4 | 2.2 | 25.2–25.6 |
| General formula (XIV) (s + t = 5, u + v = 2) | 37.3 | 35.3 | 2.0 | 25.3–25.8 |
| Fluorinated surfactant 1 | 64.7 | 47.0 | 17.7 | 25.0–25.5 |
| Fluorinated surfactant 2 | 64.3 | 49.2 | 15.1 | 25.0–25.5 |

<Ink Composition>

Using a surfactant shown in Table 1 gives ink compositions in the examples 8 to 14 including a surfactant having difference d2 ($\sigma_{10}-\sigma_1$) which is difference between dynamic surface tension ($\sigma_{10}$) of the solution obtained by making 0.1 wt % solution dissolved in purified water to be measured by using a maximum bubble pressure method at the bubble frequency of 10 Hz at a temperature from 24° C. to 26° C. and dynamic surface tension ($\sigma_1$) to be measured at a temperature from 24° C. to 26° C. and which satisfies the above-mentioned expression (2) and also gives ink compositions in the comparative examples 5 to 8 not including the surfactant having difference d2 which satisfies the above-mentioned expression (2). Table 7 shows content of each component included in each ink composition in the examples 8-14 and the comparative examples 5 to 8. In Table 7, a value in each column is represented by parts by weight, and each of the ink compositions of the examples 8 to 14 and the comparative examples 5 to 8 has a total amount of 100 parts by weight.

TABLE 7

| | Example | | | | | | | Comparative Example | | | |
| --- | --- | --- | --- | --- | --- | --- | --- | --- | --- | --- | --- |
| Composition | 8 | 9 | 10 | 11 | 12 | 13 | 14 | 5 | 6 | 7 | 8 |
| Coloring agent Dye | | | | | | | | | | | |
| C.I. Direct blue 199 | 2.5 | | | | | | | | | | |
| Pigment | | | | | | | | | | | |
| C.I. Pigment blue 15:3 | | 3 | | | | | | | | | |
| C.I. Pigment blue 15:4 | | | 3 | | | | | | | | |

TABLE 7-continued

| Composition | Example | | | | | | | Comparative Example | | | |
|---|---|---|---|---|---|---|---|---|---|---|---|
| | 8 | 9 | 10 | 11 | 12 | 13 | 14 | 5 | 6 | 7 | 8 |
| C.I. Pigment red 122 | | | | 5 | | | | | | | |
| C.I. Pigment yellow 74 | | | | | 4 | | | | | | |
| C.I. Pigment yellow 180 | | | | | | 4 | | | | | |
| carbon black | | | | | | | 5 | | | | 5 |
| C.I. Pigment blue 17 | | | | | | | | 2 | | | |
| C.I. Pigment red 58 | | | | | | | | | 3 | | |
| C.I. Pigment yellow 13 | | | | | | | | | | 2 | |
| Organic solvent | | | | | | | | | | | |
| diethylen glycol | 8 | 8 | 8 | 5 | 5 | 8 | 8 | 2 | 5 | 20 | 10 |
| Glycerin | 5 | 7 | 8 | 10 | 8 | 8 | 9 | 5 | 5 | 17 | 10 |
| 1,5-pentanediol | | | 2 | 5 | 2 | 2 | 5 | | 2 | 18 | 5 |
| TEGBE | 8 | 8 | 8 | 5 | 5 | 3 | 6 | 4 | | | 8 |
| PEG400 | | 1 | | | | | | 10 | 15 | 15 | 10 |
| Surfactant | | | | | | | | | | | |
| General formula (IX) (m + n = 10) | | 1 | | | | | | | | | |
| General formula (X) (k = 11-13, l = 15) | | | 1 | | | 1.0 | | | | | |
| General formula (XI) (h + i = 9-11, j = 9) | | | | 1.5 | | | | | | | |
| General formula (XII) (w + z = 9-11, x = 9, y = 5) | | | | | 1.5 | | | | | | |
| General formula (XIII) (p = 12, q = 8, r = 4) | | | | | | | 1 | | | | |
| Fluorinated surfactant 1 | | | | | | | | | 1 | | 0.5 |
| Fluorinated surfactant 2 | | | | | | | | | 1.5 | 1 | 0.5 |
| Binder resin | — | 1 | 1.5 | 2 | 1 | 1.5 | 1 | 1 | 1.5 | 2 | 2 |
| Polyester resin | | | | | | | | | | | |
| Water | R | R | R | R | R | R | R | R | R | R | R |

R: Remainder

The obtained ink compositions of the examples 8 to 14 and the comparative examples 5 to 8 were evaluated for the stability of discharge in case of use in the ink jet recording method and the image quality of the obtained recorded image in the following manner.

(Discharge Stability)

Each of the obtained ink compositions of the examples 8 to 14 and the comparative examples 5 to 8 was filled in an ink tank of an ink jet recording apparatus obtained by modifying a commercial ink jet recording apparatus (AJ2000: manufactured by Sharp Kabushiki Kaisha) so as that the ink head 1 shown in FIG. 1 could be mounted, and was printed continuously with a printing density of 5% on a copying ordinary paper (trade name: SF4AM3) manufactured by Sharp Kabushiki Kaisha at a printing speed of 7 A4-sized sheets per minute. In this test, the ink composition was filled again when the ink tank became empty, and the printing was continued until the printing became no longer possible by the failure of the discharge of the liquid droplets of the ink composition from the nozzle, and a number of the sheets completely printed up to this point was counted as a printable sheet number, as an index of evaluation of the discharge stability. The printable sheet number was evaluated as good (+) in case it exceeded 200, fair (±) in case it is from 150 to 200, and poor (−) in case it is less than 150.

(Image Quality)

Also each of the obtained ink compositions of the examples 8 to 14 and the comparative examples 5 to 8 was filled in an ink tank of an ink jet recording apparatus obtained by modifying a commercial ink jet recording apparatus (AJ2000: manufactured by Sharp Kabushiki Kaisha) so as that the ink head 1 shown in FIG. 1 could be mounted, and a specified pattern was printed on a copying ordinary paper (trade name: SF4AM3) manufactured by Sharp Kabushiki Kaisha to obtain an image for evaluation. After the evaluation image was left to stand for a day, a relative value of the line width of a pattern of each evaluation image, with respect to a pattern line width set as 100, was determined as an index for evaluating the image quality. The result was evaluated as good (+) in case the relative line width was less than 150 and there was almost no blotting, fair (±) in case the relative line width was from 150 to 250 with a blotting of a certain level, and poor (−) in case the relative line width exceeded 250 with a large amount of blotting.

These results of evaluation are shown in Table 8.

TABLE 8

| | Examples | | | | | | | Comparative Examples | | | |
|---|---|---|---|---|---|---|---|---|---|---|---|
| | 8 | 9 | 10 | 11 | 12 | 13 | 14 | 5 | 6 | 7 | 8 |
| Discharge stability | + | + | + | + | + | + | + | − | − | − | − |
| Image quality | + | + | + | + | + | + | + | − | − | − | − |

In the ink compositions of the examples 8 to 14 including the surfactant having the difference d2 (=$\sigma_{10}$−$\sigma_1$) which is difference between the dynamic surface tension ($\sigma_{10}$) at the bubble frequency of 10 Hz and the dynamic surface tension ($\sigma_1$) at the bubble frequency of 1 Hz satisfies the expression (2), both the discharge stability and the image quality were good. On the other hand, in the ink compositions of the comparative examples 5 to 8 not including the surfactant having a difference d2 which satisfies the expression (2) and is larger than 15 and exceeding the range of the formula (2), both the discharge stability and the image quality were poor or fair.

As mentioned above, as to a surfactant having difference d2 ($\sigma_{10}$−$\sigma_1$) which is difference between dynamic surface tension ($\sigma_{10}$) measured at the bubble frequency of 10 Hz among dynamic surface tensions of the solution obtained by making 0.1 wt % solution dissolved in purified water to be measured by using a maximum bubble pressure method at a temperature from 24° C. to 26° C. and dynamic surface tension ($\sigma_1$) to be measured at the bubble frequency of 1 Hz and which satisfies the following expression (2), when the surfactant having d2 is made included in the solution and thereby the solution is applied to the ink jet recording method, it is rendered possible to obtain an ink composition excellent in the discharge stability and capable of suppressing blotting on the recording material thereby providing a recorded image of high quality.

<Ink Set>

The ink compositions of examples 9 to 13 and comparative examples 5 to 7 were combined as ink compositions of cyan, magenta and yellow as shown in Table 9, to obtain an example ink set 2 in which the cyan ink composition includes at least either of pigment of C.I. Pigment blue 15:3 and C.I. Pigment blue 15:4, the magenta ink composition includes at least one pigment selected from a group of C.I. Pigment red 122, 209 and C.I. Pigment violet 19, and the yellow ink composition includes at least one pigment selected from a group of C.I. Pigment yellow 74, 138, 150 and 180, comparative example ink sets 5 to 7 in which one of the cyan, magenta and yellow ink compositions includes a pigment different from the aforementioned pigment, and a comparative example ink set 8 in which all the cyan, magenta and yellow ink compositions include pigments different from the aforementioned pigments.

TABLE 9

|  | Cyan | Magenta | Yellow |
|---|---|---|---|
| Example ink set 2 | Example 9 C.I. Pigment blue 15:3 | Example 11 C.I. Pigment red 122 | Example 12 C.I. Pigment yellow 74 |
| Comparative Example ink set 5 | Comparative Example 5 C.I. Pigment blue 17 | Example 11 C.I. Pigment red 122 | Example 13 C.I. Pigment yellow 180 |
| Comparative Example ink set 6 | Example 10 C.I. Pigment blue 15:4 | Comparative Example 6 C.I. Pigment red 58 | Example 13 C.I. Pigment yellow 180 |
| Comparative Example ink set 7 | Example 10 C.I. Pigment blue 15:4 | Example 11 C.I. Pigment red 122 | Comparative Example 7 C.I. Pigment yellow 13 |
| Comparative Example ink set 8 | Comparative Example 5 C.I. Pigment blue 17 | Comparative Example 6 C.I. Pigment red 58 | Comparative Example 7 C.I. Pigment yellow 13 |

Each of the obtained example ink set 2 and the comparative example ink sets 5 to 8 was used on an ink jet recording apparatus obtained by modifying a commercial ink jet recording apparatus (AJ2000: manufactured by Sharp Kabushiki Kaisha), and was printed on a glossy paper (trade name: AJ-K4AG) manufactured by Sharp Kabushiki Kaisha with a print ratio of the cyan, magenta and yellow ink compositions of 1:1:1 thereby forming a black image. Also the ink composition of the example 7 was employed as a black ink composition to obtain a same image.

Each of the obtained black image was measured with a spectrophotometer (X-Rite 938: manufactured by X-Rite Inc.) to obtain a luminance index L* and chromaticness indexes a* and b* in an L*a*b* color system (CIE: 1976).

Results of the test were evaluated as follows. Taking, in the black image formed with the ink composition of the example 14, the chromaticness indexes a* and b* respectively as A1 and $B_1$, and, in the black images formed with the example ink set 2 and the comparative example ink sets 5 to 8, the chromaticness indexes a* and b* respectively as A2 and B2, a value Δa*b* represented by a following equation (D) was determined as an index for evaluating the black color reproducibility:

$$\Delta a^* b^* = \{(A1-A2)^2 + (B1-B2)^2\}^{1/2} \quad (D).$$

A case with a value of Δa*b* equal to or less 20 (Δa*b*≦20) was evaluated as good (+), while a case exceeding 20 (Δa*b*>20) was evaluated as poor (−). Results of evaluation are shown in Table 10.

TABLE 10

|  | Evaluation result |
|---|---|
| Example ink set 2 | + |
| Comparative Example ink set 5 | − |
| Comparative Example ink set 6 | − |
| Comparative Example ink set 7 | − |
| Comparative Example ink set 8 | − |

Table 10 indicates that the black image formed by superposing three ink compositions contained in the example ink set 2 had a higher density closer to that of the black image formed with the ink composition of the example 14, in comparison with the black images formed by superposing three ink compositions contained in each of the comparative example ink sets 5 to 8. It is thus identified that the example ink set 2 has a better black color reproducibility and is superior in the color balance, in comparison with the comparative example ink sets 5 to 8.

As explained in the foregoing, by superposing a cyan ink composition including at least either of pigment of C.I. Pigment blue 15:3 and C.I. Pigment blue 15:4, a magenta ink composition including at least one pigment selected from the group consisting of C.I. Pigment red 122, 209 and C.I. Pigment violet 19, and a yellow ink composition including at least one pigment selected from the group consisting of C.I. Pigment yellow 74, 138, 150 and 180, in this manner an ink set with an excellent color balance could be obtained.

The invention may be embodied in other specific forms without departing from the spirit or essential characteristics thereof. The embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An ink set comprising:
   an ink composition comprised of a coloring agent, an organic solvent, water, and a surfactant having difference d1 ($\sigma_{10}$−γ) which is difference between dynamic surface tension ($\sigma_{10}$) of the solution obtained by making 0.1 wt % solution dissolved in purified water to be measured by using a maximum bubble pressure method at the bubble frequency of 1OHz at a temperature from 24° C. to 26° C. and static surface tension (γ) to be measured at a temperature from 24° C. to 26° C. and which satisfies the following expression (1)

$$0 mN/m \leq d1 \leq 15 \ mN/m \quad (1)$$

wherein said coloring agent comprises at least one pigment selected from the group consisting of (1) at least one selected from the group consisting of C.I. Pigment blue 15:3 and C.I. Pigment blue 15:4, (2) at least one selected from the group consisting of C.I. Pigment red 122, C.I. Pigment red 209, and C.I. Pigment violet 19, and (3) at least one selected from the group consisting of C.I. Pigment yellow 74, C.I. Pigment yellow 138, C.I. Pigment yellow 150, and C.I. Pigment yellow 180.

2. An ink set comprising:
   an ink composition comprised of a coloring agent, an organic solvent, water, and a surfactant having difference d1 ($\sigma_{10}$−y) which is difference between dynamic surface tension ($\sigma_{10}$) of the solution obtained by making 0.1 wt % solution dissolved in purified water to be measured by using a maximum bubble pressure method at the bubble frequency of 10 Hz at a temperature from 24° C. to 26° C. and static surface tension (γ) to be measured at a temperature from 24° C. to 26° C. and which satisfies the following expression (1)

$$0 \text{ mN/m} \leq d1 \leq 15 \text{ mN/m} \quad (1)$$

wherein said coloring agent comprises at least one pigment selected from the group consisting of (1) at least one selected from the group consisting of C.I. Pigment blue 15:3 and C.I. Pigment blue 15:4, (2) at least one selected from the group consisting of C.I. Pigment red 122, C.I. Pigment red 209, and C.I. Pigment violet 19, (3) at least one selected from the group consisting of C.I. Pigment yellow 74, C.I. Pigment yellow 138, C.I. Pigment yellow 150, and C.I. Pigment yellow 180, and (4) carbon black.

3. An ink set comprising:

an ink composition comprised of a coloring agent, an organic solvent, water, and a surfactant having difference d1 ($\sigma_{10}-\sigma_1$) which is difference between dynamic surface tension ($\sigma_{10}$) of the solution obtained by making 0.1 wt % solution dissolved in purified water to be measured by using a maximum bubble pressure method at the bubble frequency of 10 Hz at a temperature from 24° C. to 26° C. and dynamic surface tension ($\sigma_1$) to be measured at a temperature from 24° C. to 26° C. and which satisfies the following expression (1)

$$0 \text{ mN/m} \leq d1 \leq 15 \text{ mN/m} \quad (1)$$

wherein said coloring agent comprises at least one pigment selected from the group consisting of (1) at least one selected from the group consisting of C.I. Pigment blue 15:3 and C.I. Pigment blue 15:4, (2) at least one selected from the group consisting of C.I. Pigment red 122, C.I. Pigment red 209, and C.I. Pigment violet 19, and (3) at least one selected from the group consisting of C.I. Pigment yellow 74, C.I. Pigment yellow 138, C.I. Pigment yellow 150, and C.I. Pigment yellow 180.

4. An ink set comprising:

an ink composition comprised of a coloring agent, an organic solvent, water, and a surfactant having difference d1 ($\sigma_{10}-\Sigma_1$) which is difference between dynamic surface tension ($\sigma_{10}$) of the solution obtained by making 0.1 wt % solution dissolved in purified water to be measured by using a maximum bubble pressure method at the bubble frequency of 10 Hz at a temperature from 24° C. to 26° C. and dynamic surface tension ($\sigma_1$) to be measured at a temperature from 24° C. to 26° C. and which satisfies the following expression (1)

$$0 \text{ mN/m} \leq d1 \leq 15 \text{ mN/m} \quad (1)$$

wherein said coloring agent comprises at least one pigment selected from the group consisting of (1) at least one selected from the group consisting of C.I. Pigment blue 15:3 and C.I. Pigment blue 15:4, (2) at least one selected from the group consisting of C.I. Pigment red 122, C.I. Pigment red 209, and C.I. Pigment violet 19, (3) at least one selected from the group consisting of C.I. Pigment yellow 74, C.I. Pigment yellow 138, C.I. Pigment yellow 150, and C.I. Pigment yellow 180, and (4) carbon black.

5. The ink set of any of one claims 1 and 2, wherein the surfactant is selected from compounds represented by the following formulas (II) to (V)

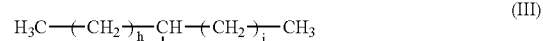
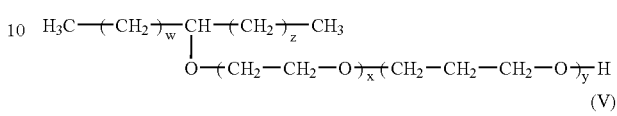
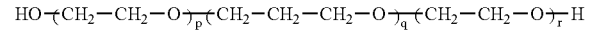

where, in formula (II), k represents an integer or fractional number from 11 to 13; and l represents 15;

in the formula (III), h represents an integer or fractional number from 0 to 11; i represents an integer or fractional number from 0 to 11; j represents 9; and a sum of h and i (h+i) represents an integer or a fractional number from 9 to 11;

in the formula (IV), w represents an integer or a fractional number from 0 to 11; x represents 9; y represents 5; z represents an integer or a fractional number from 0 to 9; and a sum of w and z (w+z) represents an integer or a fractional number from 9 to 11; and in the formula (V), p represents 12; q represents 8; and r represents 4.

6. The ink set of any one of claims 3 and 4, wherein the surfactant is selected from compounds represented by the following formulas (X) to (XIV)

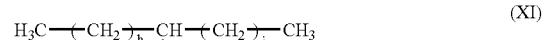
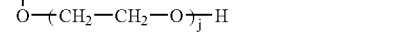
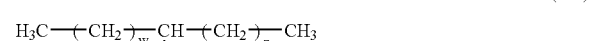
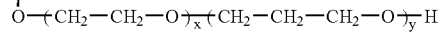
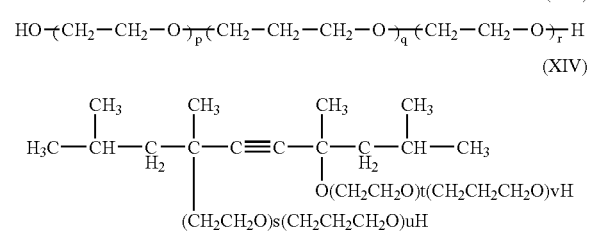

where, in the formula (X), k represents an integer or a fractional number from 11 to 13; and l represents 15;

in the general formula (XI), h represents an integer or fractional number from 0 to 11; i represents an integer or fractional number from 0 to 11; j represents 9; and a sum of h and i (h+i) represents an integer or a fractional number from 9 to 11;

in the formula (XII), w represents an integer or fractional number from 0 to 11; x represents 9; y represents 5; z represents an integer or fractional number from 0 to 9;

and a sum of w and z (w+z) represents an integer or a fractional number from 9 to 11;

in the formula (XIII), p represents 12; q represents 8; r represents 4; and in the formula (XIV), s represents an integer or fractional number from 0 to 5, t represents an integer or a fractional number from 0 to 5; a sum of s and t (s+t) represents an integer or a fractional number from 0 to 5; u represents an integer or a fractional number from 0 to 2; v represents an integer or fractional number from 0 to 2; and a sum of u and v (u+v) represents an integer or fractional number from 0 to 2.

* * * * *